United States Patent
Zhao et al.

(10) Patent No.: US 12,526,308 B2
(45) Date of Patent: Jan. 13, 2026

(54) ACTIVE DEFENSE SYSTEM AND METHOD FOR UNKNOWN THREAT

(71) Applicants: STATE GRID JIANGSU ELECTRIC POWER CO., LTD. INFORMATION & TELECOMMUNICATION BRANCH, Nanjing (CN); STATE GRID JIANGSU ELECTRIC POWER CO., LTD., Nanjing (CN); NARI INFORMATION & COMMUNICATION TECHNOLOGY CO., LTD., Nanjing (CN); NANJING UNIVERSITY OF SCIENCE AND TECHNOLOGY, Nanjing (CN)

(72) Inventors: Xinjian Zhao, Nanjing (CN); Qianmu Li, Nanjing (CN); Fei Xia, Nanjing (CN); Guoquan Yuan, Nanjing (CN); Jiaming Mao, Nanjing (CN); Linjiang Shang, Nanjing (CN); Jing Guo, Nanjing (CN); Song Zhang, Nanjing (CN); Shi Chen, Nanjing (CN); Chenwei Xu, Nanjing (CN); Haoxiang Dou, Nanjing (CN); Shunmei Meng, Nanjing (CN); Jian Liu, Nanjing (CN); Hu Song, Nanjing (CN); Qianqian Jin, Nanjing (CN)

(73) Assignees: STATE GRID JIANGSU ELECTRIC POWER CO., LTD. INFORMATION & TELECOMMUNICATION BRANCH, Jiangsu (CN); STATE GRID JIANGSU ELECTRIC POWER CO., LTD., Jiangsu (CN); NARI INFORMATION & COMMUNICATION TECHNOLOGY CO., LTD., Jiangsu (CN); NANJING UNIVERSITY OF SCIENCE AND TECHNOLOGY, Jiangsu (CN)

(*) Notice: Subject to any disclaimer, the term of this patent is extended or adjusted under 35 U.S.C. 154(b) by 189 days.

(21) Appl. No.: 18/565,259
(22) PCT Filed: Sep. 4, 2023
(86) PCT No.: PCT/CN2023/116697
§ 371 (c)(1),
(2) Date: Nov. 29, 2023
(87) PCT Pub. No.: WO2025/035511
PCT Pub. Date: Feb. 20, 2025

(65) Prior Publication Data
US 2025/0286906 A1 Sep. 11, 2025

(30) Foreign Application Priority Data
Aug. 16, 2023 (CN) .......................... 202311028145.8

(51) Int. Cl.
G06F 15/16 (2006.01)
G06F 9/54 (2006.01)
(Continued)

(52) U.S. Cl.
CPC ........... H04L 63/1441 (2013.01); G06N 3/08 (2013.01); H04L 63/1416 (2013.01)

(58) Field of Classification Search
CPC ...... H04L 63/1441; H04L 63/141; G06N 3/08
(Continued)

(56) References Cited

U.S. PATENT DOCUMENTS 9,043,905 B1 * 5/2015 Allen ...................... H04L 63/20
726/22
10,771,506 B1 * 9/2020 Kumar .................... H04L 63/02
(Continued)

FOREIGN PATENT DOCUMENTS

CN 102483838 A 5/2012
CN 106888196 A 6/2017
(Continued)

OTHER PUBLICATIONS

International Search Report for International Application No. PCT/CN2023/116697, dated May 9, 2024 (May 9, 2024)—4 pages (English translation—3 pages).
(Continued)

*Primary Examiner* — Hamza N Algibhah
(74) *Attorney, Agent, or Firm* — CM Law; Stephen J. Weed

(57) ABSTRACT

Provided are an active defense system and method for an unknown threat. The system includes an intelligent threat early-warning module (10), an unknown threat detection module (20) and a self-adaption defense processing module (30). The intelligent threat early-warning module (10) is configured to perform threat prediction on a power grid situation data set collected from a power information network in real time to obtain threat early-warning information and send the information to the unknown threat detection
(Continued)

module (20). The unknown threat detection module (20) is configured to perform threat detection and analysis on collected unknown threat network data when receiving the threat early-warning information to generate a threat analysis report and send the report to the self-adaption defense processing module (30). The self-adaption defense processing module (30) is configured to trigger a defense processing operation corresponding to a preset threat defense strategy according to the threat analysis report.

8 Claims, 12 Drawing Sheets

(51) Int. Cl.
  *G06N 3/08* (2023.01)
  *H04L 9/40* (2022.01)
  *H04L 29/06* (2006.01)
(58) Field of Classification Search
  USPC .......................................................... 726/23
  See application file for complete search history.

(56) References Cited

U.S. PATENT DOCUMENTS

| | | | |
|---|---|---|---|
| 10,984,496 B1 | 4/2021 | Rabb et al. | |
| 12,289,328 B2* | 4/2025 | Du | H04L 63/1416 |
| 2008/0115221 A1* | 5/2008 | Yun | G06F 21/552 |
| | | | 726/25 |
| 2012/0304007 A1* | 11/2012 | Hanks | G05B 23/0229 |
| | | | 714/E11.029 |
| 2018/0330083 A1* | 11/2018 | Abbaszadeh | G06N 5/04 |
| 2020/0067965 A1 | 2/2020 | Dada | |
| 2020/0067969 A1* | 2/2020 | Abbaszadeh | G06N 5/04 |
| 2022/0197306 A1* | 6/2022 | Cella | H04L 63/1441 |
| 2022/0224701 A1* | 7/2022 | Gutierrez | H04L 63/1416 |
| 2022/0224716 A1* | 7/2022 | Salji | H04L 63/1441 |
| 2023/0023083 A1* | 1/2023 | Shelton, IV | H04L 67/52 |
| 2023/0177494 A1 | 6/2023 | Davis et al. | |
| 2023/0222454 A1* | 7/2023 | Cella | G06N 7/01 |
| | | | 705/28 |
| 2023/0328081 A1* | 10/2023 | Najafirad | H04L 63/1416 |
| 2023/0362200 A1* | 11/2023 | Crabtree | G06N 5/022 |
| 2023/0403296 A1* | 12/2023 | Pickman | H04L 63/1441 |
| 2024/0106844 A1* | 3/2024 | Chen | H04L 63/1425 |

FOREIGN PATENT DOCUMENTS

| | | | | |
|---|---|---|---|---|
| CN | 107147639 A | | 9/2017 | |
| CN | 108574691 A | * | 9/2018 | G06N 20/00 |
| CN | 108600275 A | | 9/2018 | |
| CN | 108848069 A | * | 11/2018 | H04L 63/1441 |
| CN | 108881323 A | * | 11/2018 | H04L 63/1475 |
| CN | 110334155 A | | 10/2019 | |
| CN | 111211903 A | | 5/2020 | |
| CN | 111711599 A | | 9/2020 | |
| CN | 112612669 A | | 4/2021 | |
| CN | 112688315 A | | 4/2021 | |
| CN | 112925805 A | * | 6/2021 | G06F 16/25 |
| CN | 113220539 A | * | 8/2021 | G06F 11/3058 |
| CN | 113761070 A | | 12/2021 | |
| CN | 113783888 A | * | 12/2021 | H04L 63/20 |
| CN | 114493338 A | | 5/2022 | |
| CN | 115396182 A | | 11/2022 | |
| CN | 112039862 B | * | 12/2022 | H04L 63/1491 |
| CN | 115907835 A | * | 4/2023 | |
| CN | 116155519 A | | 5/2023 | |
| CN | 116527346 A | | 8/2023 | |
| WO | 2016164403 A1 | | 10/2016 | |

OTHER PUBLICATIONS

1st Office Action for Chinese Application No. 202311028145.8 dated Sep. 23, 2023 (Sep. 23, 2023), 6 pages (English translation—6 pages).
2nd Office Action for Chinese Application No. 202311028145.8 dated Nov. 2, 2023 (Nov. 2, 2023), 10 pages (English translation—16 pages).
3rd Office Action for Chinese Application No. 202311028145.8 dated Nov. 15, 2023 (Nov. 15, 2023), 17 pages (English translation—11 pages).
Cuihong, Peng: "Research on Security Situation Prediction of Power Cyber-Physics System Based on Multi-Source Data Analysis," China Energy and Environmental Protection, vol. 44, No. 10, Oct. 2022, Xianyang China—6 pages (English abstract).
Notice of Rejection for Chinese Application No. 202311028145.8 dated Nov. 27, 2023 (Nov. 27, 2023), 7 pages (English translation—8 pages).
Ying, Li: "Research on Security Analysis Technology of Power Secondary System Based on Multi-step Attack Detection", Full-text Database of Excellent Master's Dissertations in China, May 15, 2021, p. 19-27, English Abstract—1 page.
Zhao Shan: "A brief analysis of network security active defense system," Network Security Technology and Application—Issue 4, 2022, China, Shaanxi, China—2 pages; English Abstract—1 page.
Chinese Notice of Allowance for Chinese Application No. 202411113330.1, dated Jul. 11, 2025—4 pages (English translation—4 pages).
1st Chinese Search Report for Chinese Application No. 202411113330.1, dated Jun. 6, 2025 (Jun. 6, 2025)—4 pages (English translation—7 pages).
Chen, Siguang, Yang, Li, Zhao, Chuanxin, Varadarajan, Vijayakumar, Wang, Kun, "Double-Blockchain Assisted Secure and Anonymous Data Aggregation for Fog-Enabled Smart Grid," Engineering 8 (2022) 159-169; journal homepage: www.elsevier.com/locate/eng; Available online Aug. 11, 2020.
Notice of the First Review Opinion, Chinese Application No. 202411113330.1, dated Jun. 9, 2025 (Jun. 9, 2025)—6 pages (English translation—12 pages).
Wu, Haiqin, Wang, Liangmin, and Xue, Guoliang, "Privacy-aware Task Allocation and Data Aggregation in Fog-assisted Spatial Crowdsourcing," Citation Information: DOI 10.1109/TNSE.2019. 2892583, IEEE Transaction on Network Science and Engineering (Dec. 31, 2020).
Yang, Wei-yong, Guo Liang, Liao, Peng, Jin, Qian-quin; "Construction of Active Defensive System of Information Security Based on Context-Aware;" China Academic Journal Electronic Publishing House; http:/ww.cnki.net; (Jan. 14, 2016).

* cited by examiner

ACTIVE DEFENSE SYSTEM AND METHOD FOR UNKNOWN THREAT

CROSS-REFERENCE TO RELATED APPLICATIONS

This is a National Stage Application filed under 35 U.S.C. 371 based on International Patent Application No. PCT/CN2023/116697, filed on Sep. 4, 2023, which claims priority to Chinese Patent Application No. 202311028145.8 filed on Aug. 16, 2023, the disclosures of both of which are incorporated herein by reference in their entireties.

TECHNICAL FIELD

The present application relates to the technical field of power systems, for example, an active defense system and method for an unknown threat.

BACKGROUND

A power information network refers to a network in which computer technologies and communication technologies are used for interconnecting power devices to achieve functions such as intelligence, information and remote control in a power system.

Network security risks faced by the current power information network include the following: (1) Network attacks, where a hacker may access the power information network in multiple ways to attack and destroy the system, such as a distributed denial-of-service (DDoS) attack, a malware attack and data tampering, and these attacks may lead to grid power failure, data leakage and information security problems; (2) human operation errors, where the power information network involves many human operations such as system maintenance and network management, and if an operation error occurs, this may lead to a problem such as system failure or information leakage; (3) social engineering attacks, where system or application program information is obtained by camouflage, deception and information collection so as to access the computer system or network; and (4) security problems of an Internet of things (IoT) device, where a commonly used Internet of things device in the power information network has some security loopholes such as default password and failure to timely upgrade, and these problems are easily exploited by an attacker. In view of the preceding network security risks, security measures shall be taken to ensure the safe operation of the power information network.

Although security technologies in the related art may handle some traditional network security problems, the shortcomings of power information network construction are manifested in the following three aspects. First, a traditional power network security defense system is mostly constructed based on passive defense and depends on techniques such as antivirus software, firewall and identity authentication. For example, firewall technologies may effectively block most illegal intrusion operations by configuring some security access rules, but these configuration rules are static. Once attack ways become diversified, there is a lack of initiative in security protection, and detection flexibility. Second, from a technical perspective, the power network security defense mostly focuses on the boundary defense, without a comprehensive analysis of a threat and with a lack of perception sensitivity to the overall situation of a network security threat, resulting in a failure to timely respond to a changed attack and a reduced defense effect. Third, traditional defense ways rely too much on the manual operation of operation and maintenance engineers, lacking autonomy.

SUMMARY

The present application provides an active defense system and method for an unknown threat to solve the problem that security technologies of a power information network lack initiative and autonomy, and that the defense is not comprehensive, form a more refined and self-adaptive security protection system, improve the monitoring early-warning capability of a system security event and improve the overall power network defense level.

The present application provides an active defense system for an unknown threat. The system is applied to a power information network and includes an intelligent threat early-warning module, an unknown threat detection module and a self-adaption defense processing module.

The intelligent threat early-warning module is configured to perform threat prediction on a power grid situation data set collected from the power information network in real time to obtain threat early-warning information and send the threat early-warning information to the unknown threat detection module.

The unknown threat detection module is configured to perform threat detection and analysis on collected unknown threat network data when receiving the threat early-warning information to generate a threat analysis report and send the threat analysis report to the self-adaption defense processing module.

The self-adaption defense processing module is configured to trigger a defense processing operation corresponding to a preset threat defense strategy according to the threat analysis report.

The present application further provides an active defense method for an unknown threat. The method is applied to an active defense system for an unknown threat and includes the steps below.

An intelligent threat early-warning module performs threat prediction on a power grid situation data set collected from a power information network in real time to obtain threat early-warning information and sends the threat early-warning information to an unknown threat detection module.

The unknown threat detection module performs threat detection and analysis according to collected unknown threat network data when receiving the threat early-warning information to generate a threat analysis report and sends the threat analysis report to a self-adaption defense processing module.

The self-adaption defense processing module triggers a defense processing operation corresponding to a preset threat defense strategy according to the threat analysis report.

DETAILED DESCRIPTION

The terms "first", "second" and the like in the description, claims and preceding drawings of the present application are used for distinguishing between similar objects and are not necessarily used for describing a particular order or sequence. It is to be understood that the data used in this manner is interchangeable where appropriate so that embodiments of the present application described herein can also be implemented in a sequence not illustrated or described herein. Additionally, the terms "including" and "having" or any variations thereof are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

Embodiment One

Figure 1A:
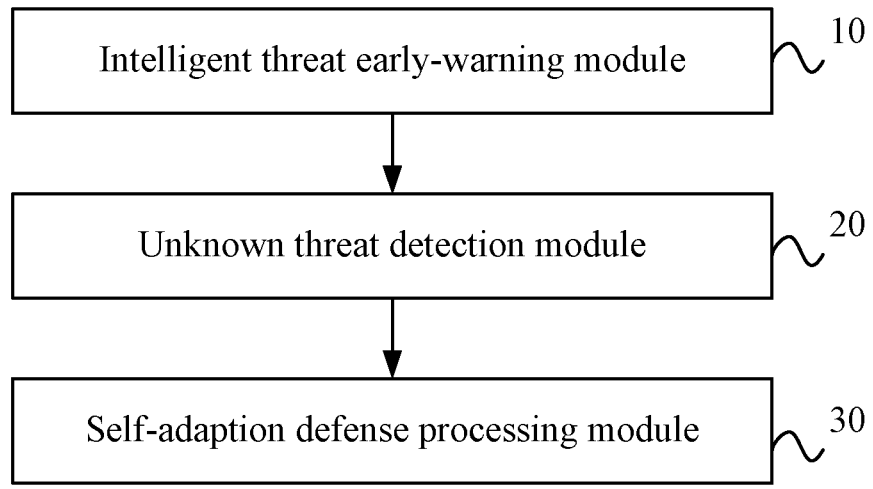
FIG. 1A is a diagram illustrating the structure of an active defense system for an unknown threat according to embodiment one of the present application.

FIG. 1A is a diagram illustrating the structure of an active defense system for an unknown threat according to embodiment one of the present application. The active defense system is applicable to a power information network for defending an unknown threat in the power information network. As shown in FIG. 1A, the system includes an intelligent threat early-warning module 10, an unknown threat detection module 20 and a self-adaption defense processing module 30. The intelligent threat early-warning module 10 is configured to perform threat prediction on a power grid situation data set collected from the power information network in real time to obtain threat early-warning information and send the threat early-warning information to the unknown threat detection module 20. The unknown threat detection module 20 is configured to perform threat detection and analysis on collected unknown threat network data when receiving the threat early-warning information to generate a threat analysis report and send the threat analysis report to the self-adaption defense processing module 30. The self-adaption defense processing module 30 is configured to trigger a defense processing operation corresponding to a preset threat defense strategy according to the threat analysis report.

The intelligent threat early-warning module 10 is a module for predicting a possibly generated threat and delivering an early warning before a network security problem occurs. The unknown threat detection module 20 performs detection and analysis on data, a behavior, or an application that has an unknown threat when the network security problem occurs. Functions of the self-adaption defense processing module 30 lie in protection and processing when early-warning information and a network security threat are generated.

According to a preset early-warning mechanism, the intelligent threat early-warning module 10 performs the threat prediction on the power grid situation data set collected from the power information network in real time to obtain the threat early-warning information so as to achieve an active early warning of an unknown threat. The early-warning mechanism may include, but is not limited to, an early-warning mechanism predicted based on situation perception and a network model, an early-warning mechanism predicted based on big data, an early-warning mechanism shared based on alliance chain intelligence, or another early-warning mechanism. After acquiring the threat early-warning information, the intelligent threat early-warning module 10 sends the threat early-warning information to the unknown threat detection module 20.

When receiving the threat early-warning information, the unknown threat detection module 20 performs the threat detection and analysis on the collected unknown threat network data according to a preset detection and analysis method to generate the threat analysis report so as to achieve an active detection and comprehensive analysis of the unknown threat. The detection method includes, but is not limited to, a threat detection method based on a deep learning model, a detection method based on a complex-event processing framework, or a detection method based on encrypted traffic. The unknown threat detection module 20 sends the obtained threat analysis report to the self-adaption defense processing module 30.

After receiving the threat analysis report, the self-adaption defense processing module 30 triggers the defense processing operation corresponding to the preset threat defense strategy according to the threat analysis report to achieve the active defense of the unknown threat.

Embodiments of the present application provide an active defense system for an unknown threat. The system includes the intelligent threat early-warning module, the unknown threat detection module and the self-adaption defense processing module. The intelligent threat early-warning module is configured to perform the threat prediction on the power grid situation data set collected from the power information network in real time to obtain the threat early-warning information and send the threat early-warning information to the unknown threat detection module. The unknown threat detection module is configured to perform the threat detection and analysis on the collected unknown threat network data when receiving the threat early-warning information to generate the threat analysis report and send the threat analysis report to the self-adaption defense processing module. The self-adaption defense processing module is configured to trigger the defense processing operation corresponding to the preset threat defense strategy according to the threat analysis report. Through active early warning, timely detection and active defense, the problem that security technologies of the power information network lack initiative and autonomy, and that the defense is not comprehensive can be solved, a more refined and self-adaptive security protection system can be formed, the monitoring early-warning capability of a system security event can be improved, and the overall power network defense level can be improved.

Figure 1B:
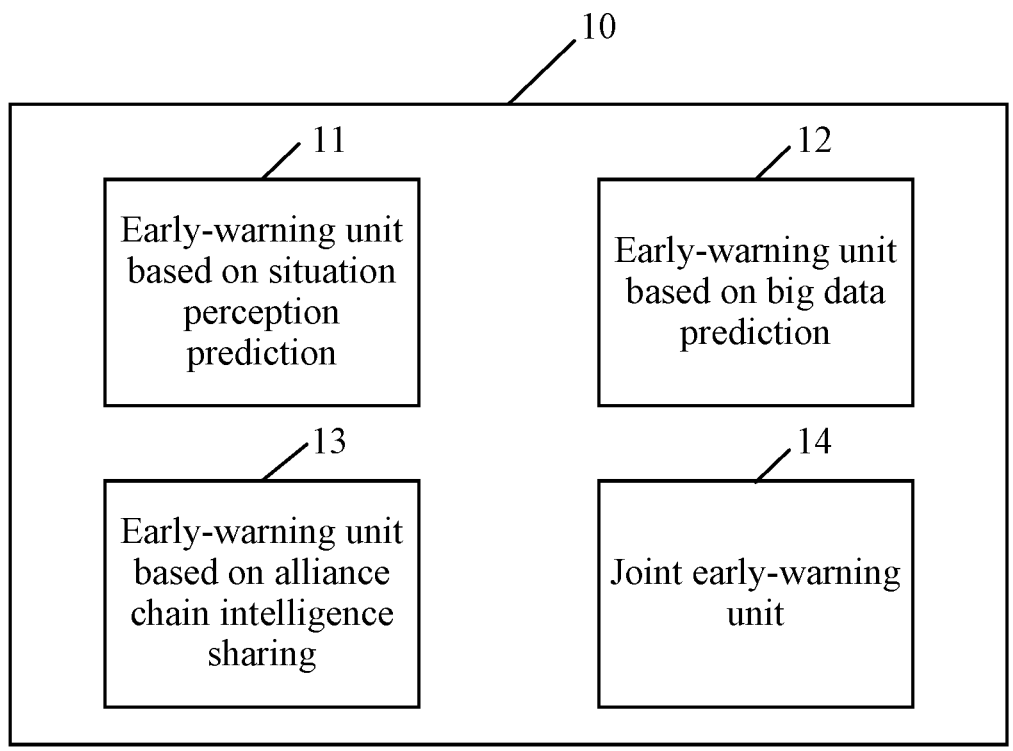
FIG. 1B is a block diagram illustrating the structure of an intelligent threat early-warning module according to embodiment one of the present application.

In an optional embodiment, FIG. 1B is a block diagram illustrating the structure of an intelligent threat early-warning module according to embodiment one of the present application. Referring to FIG. 1B, the intelligent threat early-warning module 10 includes an early-warning unit 11 predicted based on situation perception, an early-warning unit 12 predicted based on big data, an early-warning unit 13 shared based on alliance chain intelligence and a joint early-warning unit 14.

The early-warning unit 11 predicted based on the situation perception is configured to predict a multi-source power grid situation data set collected from the power information network through a pre-trained situation prediction model to obtain a situation prediction result and generate first threat early-warning information according to the situation prediction result. The early-warning unit 12 predicted based on the big data is configured to process collected log data of a device through a pre-trained data mining model and feature extraction model to obtain a threat prediction result and generate second threat early-warning information according to the threat prediction result. The early-warning unit 13 shared based on the alliance chain intelligence is configured to acquire threat intelligence data of a threatened node in the power information network through an alliance chain and determine third threat early-warning information according to the threat intelligence data. The joint early-warning unit 14 is configured to generate joint early-warning information according to the first threat early-warning information, the second threat early-warning information and the third threat early-warning information and send the joint early-warning information to the unknown threat detection module 20.

The multi-source power grid situation data set refers to a power grid situation data set collected from different sources.

Devices refer to multiple kinds of security devices used in the power grid, such as an "intrusion defense device" and a "WEB application firewall."

The node refers to a power system terminal. The threatened node is a threatened power system terminal.

The first threat early-warning information is threat early-warning information obtained by being predicted by the early-warning unit 11 predicted based on the situation perception. The second threat early-warning information is threat early-warning information obtained by being predicted by the early-warning unit 12 predicted based on the big data. The third threat early-warning information is threat early-warning information obtained by being predicted by the early-warning unit 13 shared based on the alliance chain intelligence.

The early-warning unit 11 predicted based on the situation perception predicts multi-source heterogeneous power grid situation data in the power information network through the pre-trained situation prediction model to obtain the situation prediction result. The first threat early-warning information is generated according to the situation prediction result.

Exemplarily, the steps of obtaining the trained situation prediction model include the following: A training sample set is constructed, an initial situation prediction model is constructed, and iteration training is performed on the initial situation prediction model by using the training sample set.

Figure 2:
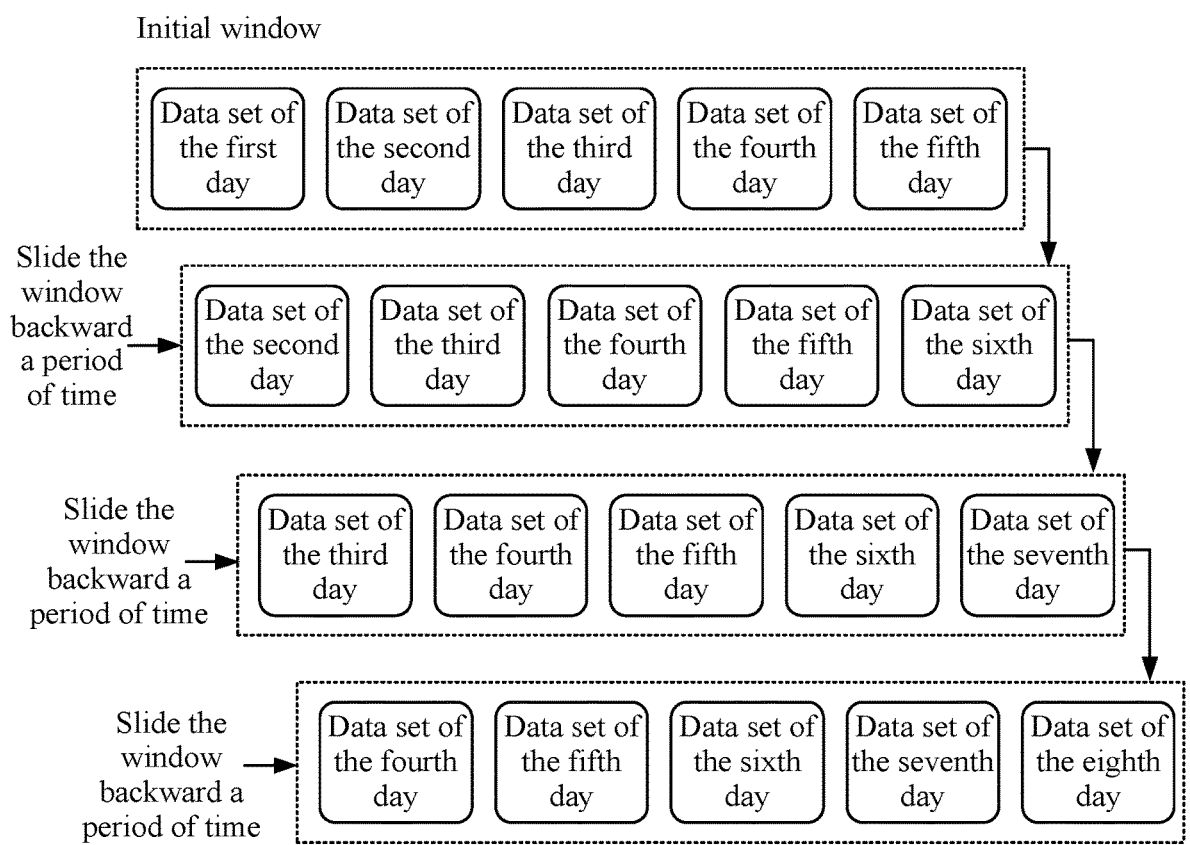
FIG. 2 is a diagram illustrating a generation process of an exemplary training sample set according to embodiment one of the present application.

The manner of constructing the training sample set may be that the training sample set is constructed by extracting, cleaning, converting and loading power grid situation data set collected in historical time. In this embodiment, to enable discrete multi-source power grid situation data sets to become linearly associated, a sliding window may be used for processing the power grid situation data set to obtain the training sample set. FIG. 2 is a diagram illustrating a generation process of an exemplary training sample set according to embodiment one of the present application. As shown in FIG. 2, the width of the sliding window is set as 5, a corresponding 5-day data set in the window is collected each time, and the window is slid with 1 as a step. After the window is slid, the 5-day data set in the window is collected. A processing result of the data set collected in each window is used as a training sample set so that multiple training sample sets that are linearly associated can be obtained.

The manner of constructing the initial situation prediction model may be that the initial situation prediction model is constructed through a bagging algorithm. The initial situation prediction model is composed of 5 parallel v-support vector machine (v-SVM) sub-models.

The process of performing the iteration training on the initial situation prediction model by using the training sample set may be that the maximum iteration number of times of the bagging method is set as 5, v-SVM is regarded as a weak learning method, a v-SVM prediction sub-model is constructed through the bagging method, and parameters of a v-SVM prediction sub-model sequence set are initialized. The prediction sub-model sequence set is represented by an equation below.

$$A=(A_1, A_2, A_3, A_4, A_5)$$

$A_5$ denotes the sequence of the 5th prediction sub-model. The initialized parameters include a kernel function parameter and sequence parameter of a sub-model. In the training sample set, half of training samples are returned, repeated and randomly extracted, and the extracted samples are used as prediction samples of 5 prediction sub-models for training. A new sequence set of the 5 prediction sub-models obtained by training is expressed as: $B=(B_1, B_2, B_3, B_4, B_5)$. $B_5$ denotes the new sequence of the 5th prediction sub-mode.

Other training samples are input into the new sequence set to obtain a power grid situation prediction value set of the 5 prediction sub-models. The 5 situation prediction values are integrated, and the integrated result is used as the situation prediction result of the situation prediction model. The integration manner is to take the average value of the 5 situation prediction values as the situation prediction result corresponding to the finally output training sample set. A loss function is calculated according to the situation prediction result and an annotation result in the training samples. Model parameters of the initial situation prediction model are adjusted according to the loss function until the situation prediction model is obtained. For example, the model parameters of the initial situation prediction model are adjusted according to the loss function until the loss function reaches the minimum value, and the initial situation prediction model at this time is used as the situation prediction model.

The early-warning unit 12 predicted based on the big data processes the collected log data of the device through the pre-trained data mining model and feature extraction model to obtain the second threat early-warning information. The device includes, but is not limited to, a host device, a network device, or a security device.

Figure 3:
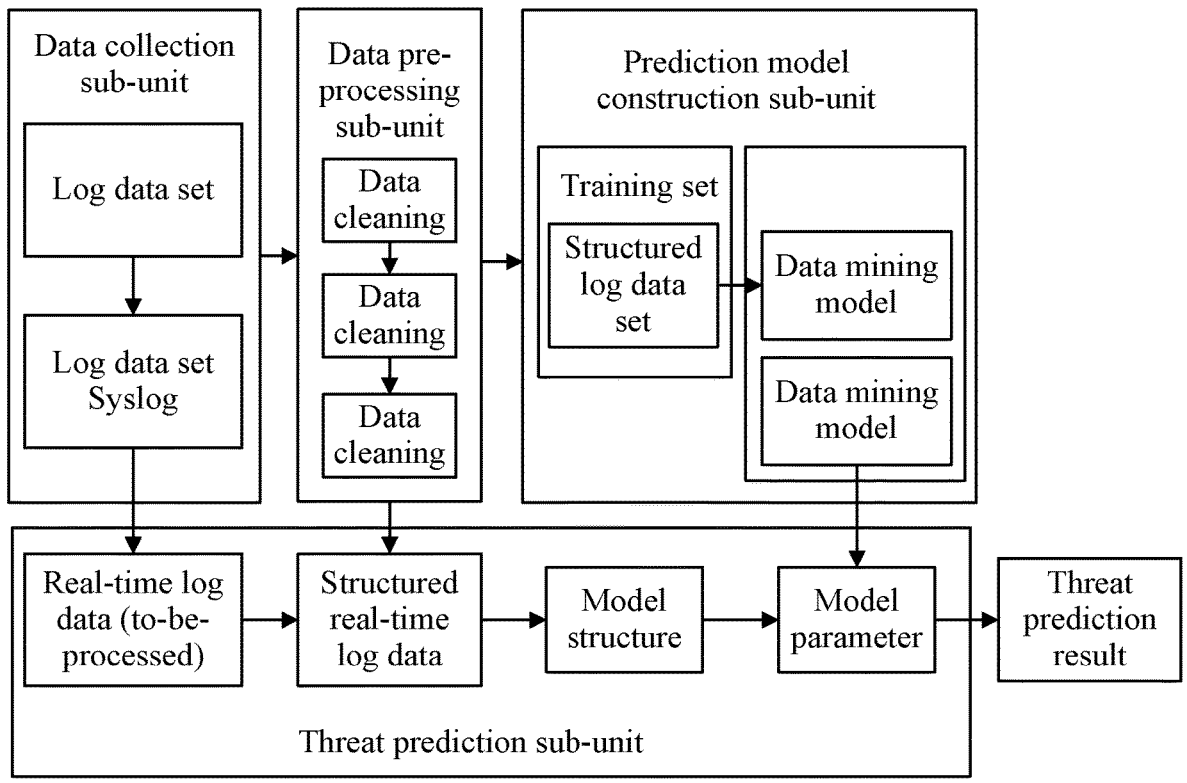
FIG. 3 is a diagram illustrating a service flow of an early-warning unit based on big data prediction according to embodiment one of the present application.

FIG. 3 is a diagram illustrating the structure of an early-warning unit based on big data prediction according to embodiment one of the present application. As shown in FIG. 3, the early-warning unit 12 predicted based on the big data includes a data collection sub-unit, a data pre-processing sub-unit, a prediction model construction sub-unit and a threat prediction sub-unit.

Figure 4:
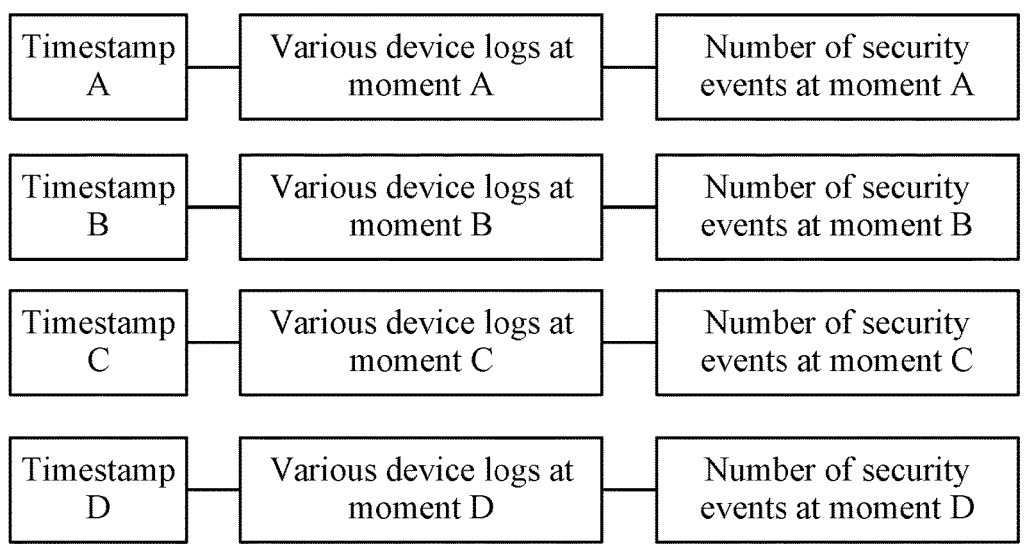
FIG. 4 is a diagram illustrating a collection process of log data according to embodiment one of the present application.

(1) The data collection sub-unit. The log data may be collected from the host device, the network device and the security device. FIG. 4 is a diagram illustrating a collection process of log data according to embodiment one of the present application. As shown in FIG. 4, the log data not only includes log information of assets during the normal operation period of the power grid, but also includes log information before, during and after a network security event that has occurred. The log information of the network security event can help a threat prediction model learn the relationship between different types of devices and the relationship between each type of device and the network security event when the network security event occurs. Collection of the log data may use a system log (syslog) protocol. The syslog uses a log message format having a hierarchical structure, which includes information such as a priority, timestamp, log source and message content, so that unstructured data entries for the number of log-security events of each type of power grid device can be constructed in chronological order.

(2) The data pre-processing sub-unit. Processing operations of the log data include, but are not limited to, data cleaning, data supplement and data conversion. The data cleaning process is to delete a data column irrelevant to a threat prediction task and an entry having a large number of missing items. The data supplement process is to use methods such as an average value supplement and nearby supplement only for an entry merely having a few missing items. The data conversion may convert the collected unstructured data to unified structured data so as to facilitate the subsequent operation of the data mining module and feature extraction module. For alphabetic string-type non-numerical data, word-to-vector (word2vec) and document-to-vector (doc2vec) methods are used for converting the alphabetic string-type non-numerical data into vectors. For discrete data, a one-hot encoding method is used for making the discrete data continuous and converted to multi-dimensional vectors.

(3) The prediction model construction sub-unit. A training set is formed based on the collected and pre-processed data, and the data mining model based on a machine learning method and the feature extraction model based on deep learning are constructed. In the data mining part, a light gradient-boosting machine (LightGBM) method is selected for training.

After multiple cross-verifications, an optimal parameter model is selected and saved. In the threat feature extraction part, a deep neural network (DNN) is selected for training. In the training process, multiple batches of gradient descent are used for convergence and optimization, and the optimal parameter model is selected and saved after the multiple cross-verifications.

(4) The threat prediction sub-unit. According to the constructed data mining model and feature extraction model, log data of a designated device in the power grid is collected every certain time interval. After being pre-processed, the log data is input into the data mining model and feature extraction model, the threat prediction result is obtained by weighting the output of the data mining model and feature extraction model, and the second threat early-warning information is generated according to the threat prediction result.

The early-warning unit 13 shared based on the alliance chain intelligence is configured to acquire the threat intelligence data of the threatened node in the power information network through the alliance chain and determine the third threat early-warning information according to the threat intelligence data.

Figure 5:
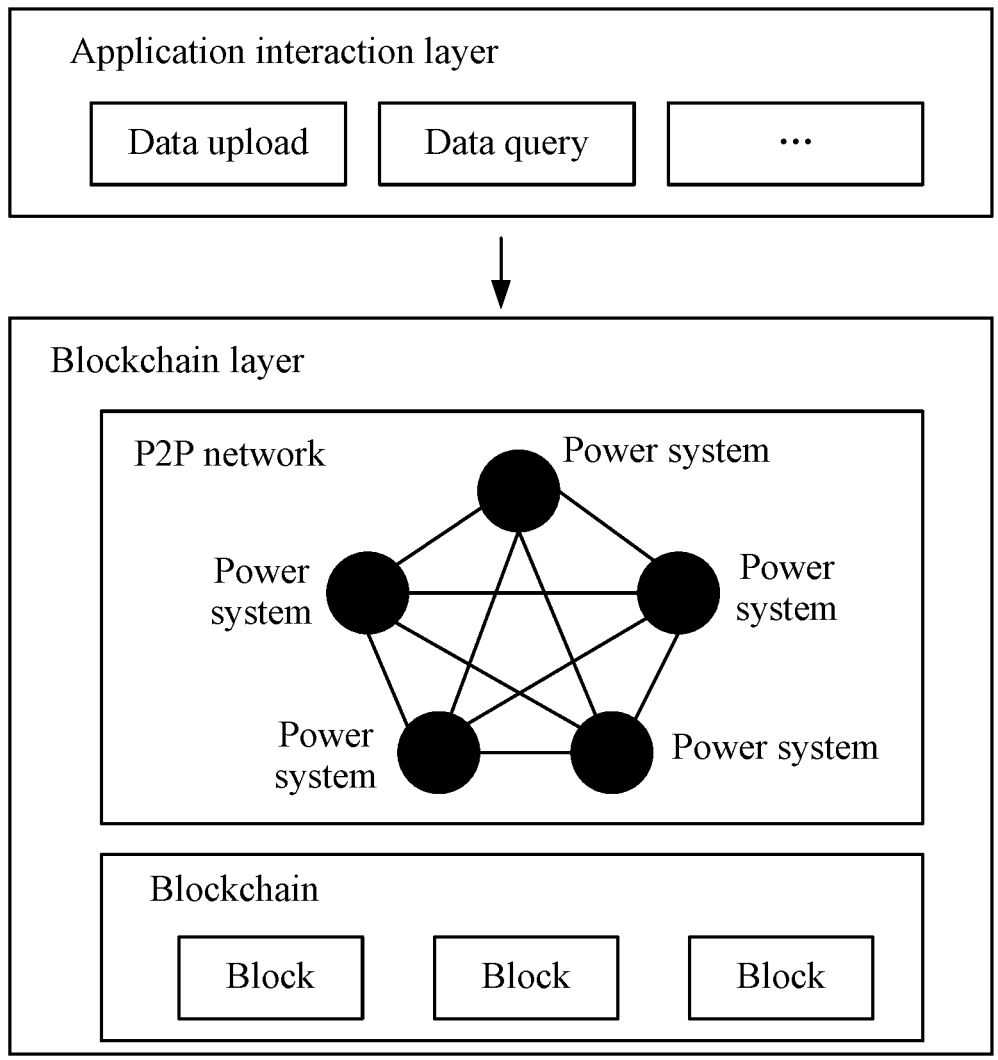
FIG. 5 is a diagram illustrating a sharing flow of threat intelligence in a blockchain according to embodiment one of the present application.

FIG. 5 is a diagram illustrating the structure of an early-warning unit based on alliance chain intelligence sharing. As shown in FIG. 5, the early-warning unit 13 shared based on the alliance chain intelligence includes the structures below.

(1) Construction of an application interaction layer. Under a sharing mechanism, each power system terminal serves as one node in the network. Each node may not only serve as an information contributor to upload intelligence for other nodes in the network to download, but also serve as an intelligence acquirer to acquire intelligence-associated information through a blockchain network. After a node in each power system network is attacked, the mode and type of the attack and other relevant information are encapsulated into multiple pieces of intelligence to be uploaded to the blockchain network. At this time, other power system nodes in the network may download these pieces of intelligence to update the existing defense strategies so as to achieve the purposes of threat early warning and active defense. The application interaction layer encapsulates some basic functions to implement the preceding operations, such as the common basic functions in a sharing network, such as data upload and data query. These functions are encapsulated into a transaction in the form of standard transaction and sent to a requesting node. Finally, the node stores data in a blockchain after completing the request.

(2) A blockchain layer. A peer-to-peer (P2P) network and the blockchain are included. The transmission and processing of transactions may be completed in the P2P network. If the transmitted transactions (intelligence) need to be packed into blocks for storage, these transactions need to pass a consensus protocol, then are packed into the blocks and are subsequently uploaded into the blockchain. The blockchain layer needs to be jointly maintained by power system nodes in the entire alliance chain network. If one region uses the same one blockchain network, nodes in the network may be divided into different types of groups according to different system types. The entire sharing mechanism does not have a dedicated administrator, but access control is performed on untrusted power system nodes according to the different behaviors and identities of power systems. Some power system nodes may be given a relatively high reliability at the very beginning while the other power system nodes dynamically adjust the reliabilities according to their behaviors. For a power system node having a relatively low reliability, the power system node is forbidden to participate in the maintenance of public intelligence so that the power system node cannot obtain the intelligence shared in the network.

In an alliance blockchain, each power system may be regarded as one node in the blockchain. After a blockchain network is constructed, power systems in different regions may perform threat intelligence resource sharing through the blockchain network. According to the situation of each region, a power system organization of each region may select a regional power system representative to represent its own organization and apply to become a node in the blockchain. The regional power system representative is responsible for maintaining a blockchain ledger and sharing intelligence through the blockchain network in the blockchain in the form of a blockchain node. Each regional power system representative participates in a unified intelligence sharing system on behalf of an organization and handles threat intelligence sharing by setting a rule (consensus mechanism) that may achieve a network-wide consensus, and a pre-deployed program. A pre-defined program, also referred as a chaincode, deploys the chaincode in the blockchain, providing some basic operations for the representative member node of each organization. Storage of intelligence is divided into two parts: off-chain storage and on-chain storage. The off-chain storage is the same as a traditional centralized sharing mechanism. Some power systems in the organization upload collected network threat intelligence to a local database while the other power systems in the organization may download the threat intelligence from the local database. The on-chain storage refers to that the power system representative of each organization uploads the threat intelligence in the local database of each organization to the blockchain for the other organizations in the blockchain to download. The power system representative of each organization also allows access to intelligence stored by the other organizations in the blockchain and then uploads the intelligence to the local database of each organization for other nodes of each organization to download.

Figure 6:
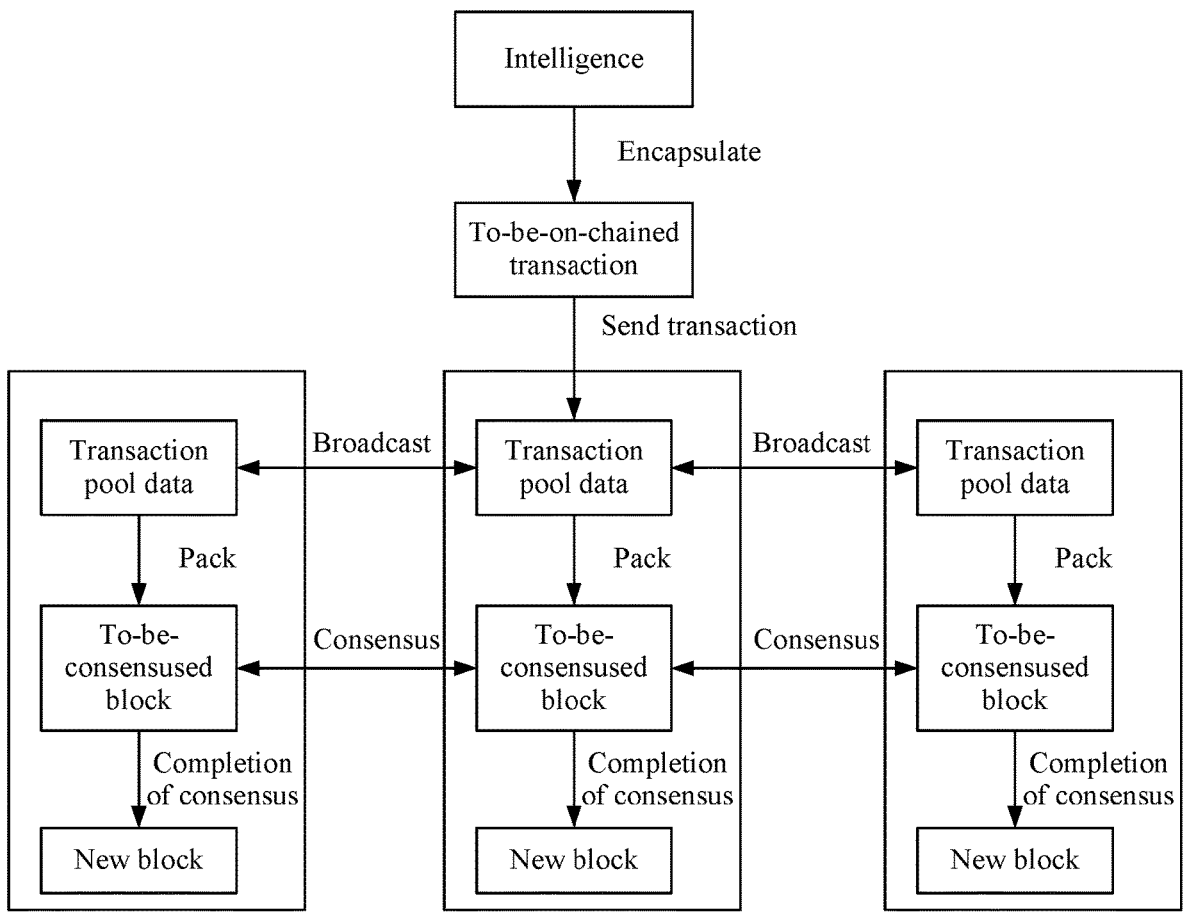
FIG. 6 is a diagram illustrating a sharing flow of another threat intelligence in a blockchain according to embodiment one of the present application.

FIG. 6 is a diagram illustrating a sharing flow of threat intelligence in a blockchain according to embodiment one of the present application. As shown in FIG. 6, transmission of intelligence may be completed in the form of a transaction. Therefore, in a blockchain-based threat intelligence sharing mechanism, each sharing of a piece of threat intelligence may be regarded as initiating a transaction and a standard intelligence sharing. The sharing flow is the following.

(1) Transaction endorsement. If a power system wants to share intelligence data, the intelligence is encapsulated by the power system as a transaction, and then the power system sends the transaction to an endorsement node in the network and requests the transaction to be uploaded to the blockchain. After receiving the request, the endorsement node first reads the ledger of the current blockchain locally, signs the blockchain status obtained by reading the ledger and the blockchain status obtained by joining the transaction and returns the signature to the power system.

(2) Organization as a block. After receiving the data returned by the endorsement node, a power system program packs the data, and organization nodes in the network subsequently receive the broadcast of the data, and a unified transaction pool is formed. After receiving the data, the organization nodes start to perform a set pluggable consensus protocol, and after passing the consensus protocol, the transaction is packed into a block.

(3) Confirmation and submission. The organization nodes broadcast the packed block to all submission nodes participating in this consensus for verification. If most submission nodes have verified the block, the block is uploaded to the blockchain. The steps include the following: A node participating in the consensus verifies the accuracy and legality of the transaction information in the block, obtains the blockchain status obtained by reading the blockchain ledger by the endorsement node when the transaction is submitted and compares this obtained blockchain status with the local blockchain status to see whether they are consistent; and if they are consistent, the node regards the transaction problem-free and sends its decision to other nodes participating in the consensus. After these verifications are completed, the block is added to the end of the blockchain, and the status of the ledger is accordingly updated. A submission node replies with a message to notify the power system of the successful submission and completed consensus. The power system nodes in the blockchain reach a consensus on the uplink of the block and ensure the synchronization of the blockchain ledger.

Figure 1C:
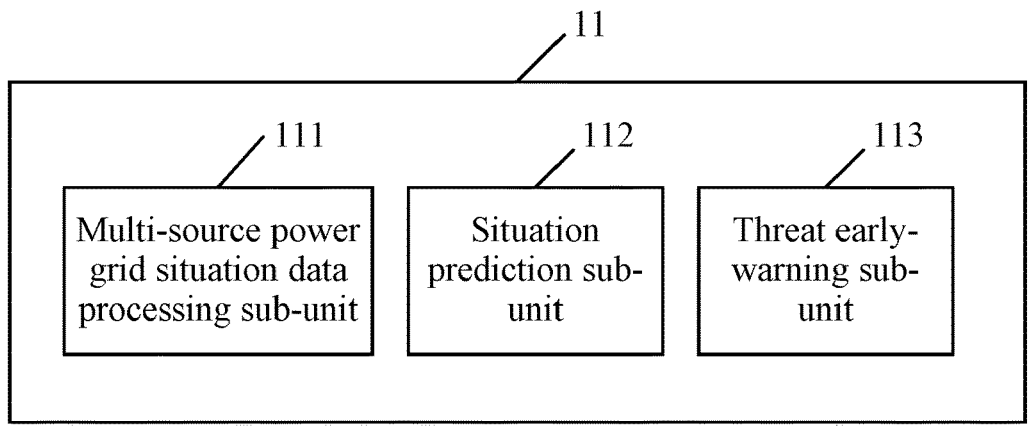
FIG. 1C is a block diagram illustrating the structure of an early-warning unit based on situation perception prediction according to embodiment one of the present application.

In an embodiment, FIG. 1C is a block diagram illustrating the structure of an early-warning unit based on situation perception prediction according to embodiment one of the present application. Referring to FIG. 1C, the early-warning unit 11 predicted based on the situation perception includes a multi-source power grid situation data processing sub-unit 111, a situation prediction sub-unit 112 and a threat early-warning sub-unit 113.

The multi-source power grid situation data processing sub-unit 111 is configured to collect multi-source power grid situation data and perform data conversion and data pre-processing on the multi-source power grid situation data to obtain the multi-source power grid situation data set. The situation prediction sub-unit 112 is configured to input the multi-source power grid situation data set into the pre-trained situation prediction model to obtain the situation prediction result. The threat early-warning sub-unit 113 is configured to compare the situation prediction result with a situation critical value and generate the first threat early-warning information according to the compared result.

The multi-source power grid situation data processing sub-unit 111 performs the data conversion and data pre-processing on the collected multi-source power grid situation data. The multi-source power grid situation data conversion includes three parts: smoothing, scaling and generalization of the multi-source power grid situation data.

(1) The smoothing of the multi-source power grid situation data. The smoothing of the multi-source power grid situation data can clear the irrelevant data and noise data in the multi-source power grid situation data, and the used processing method is a moving average method. The core idea of the moving average method is to average a total of $2n+1$ observation values collected before and after the current data and to take the average value as a substitute for the current data. The smoothing of the multi-source power grid situation data may be completed by smoothing the data and eliminating the data having a relatively large deviation from most of the data.

(2) The scaling of the multi-source power grid situation data. The scaling of the multi-source power grid situation data is to process the same attribute value having a relatively large range and make it fall into a specific and relatively small range. The scaling formula is the following.

$$X_{scaled} = \frac{X_{sta}}{X_{max} - X_{min}} + X_{min}$$

$X_{scaled}$ denotes the data scaling result. $X_{sta}$ denotes the data designated scaling range. $X_{max}$ denotes the maximum value of the multi-source power grid situation data on one attribute. $X_{min}$ denotes the minimum value of the multi-source power grid situation data on one attribute.

(3) The generalization of the multi-source power grid situation data. The generalization of the multi-source power grid situation data can abstract detailed information in an original concept layer of attribute data and promote the detailed information to a relatively high concept layer. The generalization process is the following: ① A data table of power grid situation attribute data is input; ② a generalization parameter ω is set; ③ a privacy protection threshold T of the data table is calculated; ④ all strategies in the data table are enumerated, strategies having a strategy value greater than the threshold T are directly filtered in the enumeration of the strategies, and the strategy space of the remaining strategies is generated; ⑤ for the generated strategy space, filtering is implemented through @-approximate skyline to obtain a candidate strategy space; (6) a skyline of the candidate strategy space is implemented to obtain a recommended strategy set; and ⑦ the recommended strategy set and its corresponding generalization are output.

The situation prediction sub-unit 112 inputs the multi-source power grid situation data set into the 5 prediction sub-models in the pre-trained situation prediction model for situation prediction, obtains power grid situation prediction values of the 5 prediction sub-models and takes the average value of the 5 power grid situation prediction values as the final situation prediction result.

The threat early-warning sub-unit 113 sets the situation critical value of a power grid terminal based on prior knowledge. When the situation prediction result output by the situation prediction sub-unit 112 exceeds a preset situation critical value, the first threat early-warning information is generated for a threat early warning.

Figure 1D:
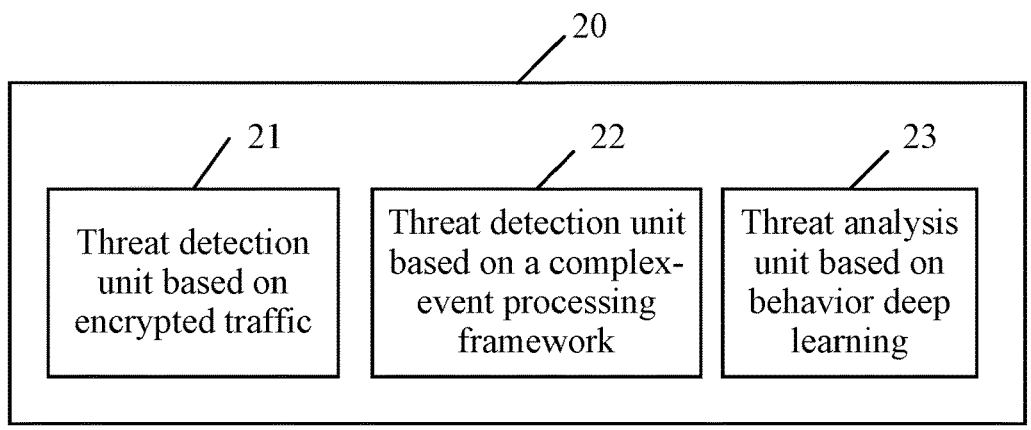
FIG. 1D is a block diagram illustrating the structure of an unknown threat detection module according to embodiment one of the present application.

In an optional embodiment, FIG. 1D is a block diagram illustrating the structure of an unknown threat detection module according to embodiment one of the present application. Referring to FIG. 1D, the unknown threat detection module 20 includes a threat detection unit 21 based on encrypted traffic, a threat detection unit 22 based on a complex-event processing framework and a threat analysis unit 23 based on behavior deep learning.

The threat detection unit 21 based on the encrypted traffic is configured to perform threat detection on collected first unknown threat network data to obtain a first threat detection result, and the first unknown threat network data includes: encrypted communication malicious traffic data, an encrypted attack behavior, or a malicious application. The threat detection unit 22 based on the complex-event processing framework is configured to perform threat analysis on collected second unknown threat network data according to a threat event detection rule based on the complex-event processing framework to obtain a second threat detection result, and the second unknown threat network data includes log data of a threatened device. The threat analysis unit 23 based on the behavior deep learning is configured to perform deep learning on the first threat detection result and the second threat detection result to obtain the threat analysis report.

The unknown threat network data includes the first unknown threat network data and the second unknown threat network data.

Figure 7:
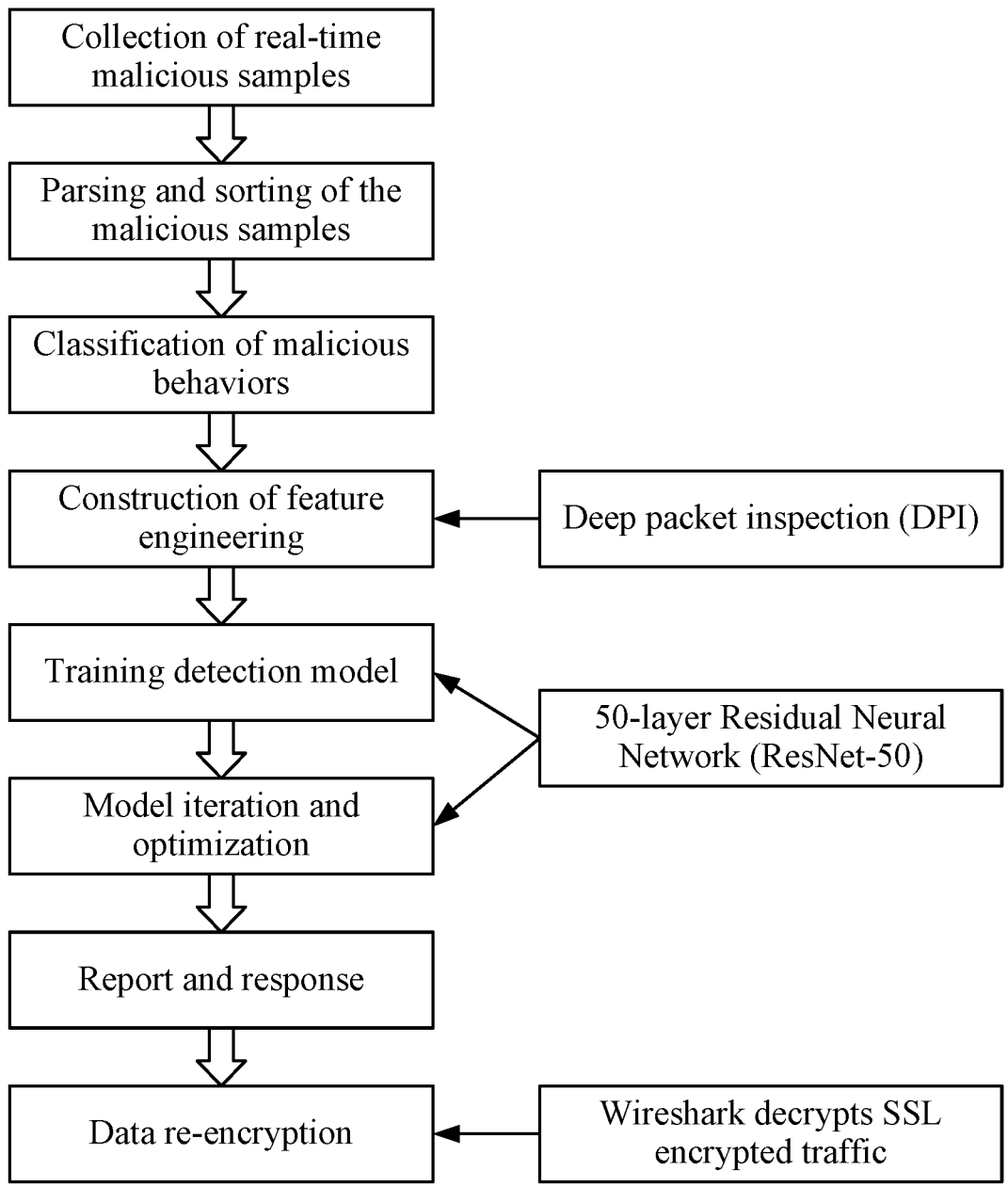
FIG. 7 is a flowchart of a traffic encryption security detection method according to an embodiment of the present application.

The threat detection unit 21 based on the encrypted traffic performs the threat detection on the collected first unknown threat network data by using a traffic encryption security detection method to obtain the first threat detection result. The first unknown threat network data includes: the encrypted communication malicious traffic data, the encrypted attack behavior, or the malicious application. The traffic encryption security detection method is to explore, test and verify multiple detection ways by performing deep analysis and data observation on a large number of malicious samples using encrypted communication, attack behaviors of multiple encrypted channels and multiple malicious or illegal applications. FIG. 7 is a flowchart of a traffic encryption security detection method according to an embodiment of the present application. As shown in FIG. 7, the traffic encryption security detection method includes the steps below.

(1) Collection of real-time malicious samples. The key to ensuring the accuracy and timeliness of a detection engine is the accuracy and coverage of data collection. The data collection includes 3 approaches to collect data from actual network environments, simulate test data and track the latest samples and the latest attack manner. The collected data includes the malicious samples using encrypted communication, over 200 families, covering multiple types of malicious behaviors, secure sockets layer (SSL) versions and encryption algorithms; multiple types of attack software that may launch attacks on encrypted channels, and actual environment data, where attack types include: scanning detection, brute force cracking and Challenge Collapsar (CC) attack; and multiple types of malicious application software and actual environment data, including Tor, Free Gate and unbounded browsing.

(2) Parsing and sorting of the malicious samples. The data set is ensured to be complete and impurity-free. All collected data needs to be deeply parsed and sorted to ensure the quality of data transmitted to an Artificial Intelligence (AI) model in the later stage for training. Analysis tasks include: deep parsing of functions, encryption mechanisms, communication manners and harms of the malicious samples; and analysis of attack types, data formats and encryption manners of attack and malware software. Data processing includes two steps: one to obtain sample communication data through a sandbox and a virtual machine, and the other to format the data.

(3) Classification of malicious behaviors. Malicious encrypted traffic is a broad concept and includes multiple types of malicious behaviors. Each type of data feature has subtle differences. To acquire higher accuracy, the background and characteristics of each type of encrypted traffic must be first distinguished. Through the analysis of massive malicious encrypted traffic, the data may be classified into three categories: first, malicious codes using encrypted communication traffic, where over 200 families are included, malicious code types include: Trojan Horse, ransomware, infectious virus, worm-type virus, downloader and others, and the encrypted communication manners used by the malicious codes also include six types: command and control (C2) server, detection host networking environment, normal communication of parent program, white station covert transfer and worm propagation communication; second, malicious attack traffic in encrypted channels, where attack types include probe scanning, brute force cracking, information theft and CC attack; and, third, malicious or illegal encrypted application communication traffic, where applications include: Tor, wall-climbing software and illegal Virtual Private Network (VPN).

(4) Construction of feature engineering. Feature engineering includes three parts: feature construction, feature extraction and feature selection. To ensure that the accuracy of a later detection engine is high enough, the feature engineering holds the key. In the stage of the construction of feature engineering, depth feature extraction is performed simultaneously. Some features are trained through convolutional neural network (CNN) and recurrent neural network (RNN) methods.

(5) A training detection model. Methods used in model training include linear regression, random forest, decision tree, multilayer perceptron (MLP), support vector machine (SVM), logistic regression and the convolutional neural network (CNN).

(6) Model iteration and optimization. After the initial training of the model is completed, the model is constantly optimized, and optimization methods include parameter tuning, verification and testing as well as actual network traffic data testing and iterative training of a selected model. Finally, for each type of encrypted traffic, according to the actual test result, the best method and parameters are selected to ensure the accuracy.

(7) Report and response. Once a potential threat is detected, a warning or report is generated. A security team may take appropriate measures based on this information, such as blocking malicious traffic, quarantining an infected device, or initiating an investigation. For an advanced threat, continuous monitoring may be required to ensure that the threat is eliminated.

(8) Data re-encryption. After decrypted traffic is analyzed and processed, the data usually needs to be re-encrypted and then sent to the final destination. This helps ensure confidentiality and completeness of the data throughout the transmission.

A specific example is provided below to explain the threat analysis based on the encrypted traffic in the present application, including the steps below.

In step 2.1.1, network data packets on the power grid are captured and saved by using tcpdump and are defined as $\{x_1, x_2, \ldots, x_n\}$.

In step 2.1.2, the captured data packets on the power grid are then analyzed by using a Wireshark tool and defined by a behavior tag as $\{\hat{y}^1, \hat{y}^2, \ldots, \hat{y}^N\}$.

In step 2.1.3, a classifier for classifying traffic behaviors is trained by a CNN model, the backbone of the classifier uses a 50-layer residual neural network (ResNet-50), and the classifier is called F. When any one input x enters the F, a corresponding tag y and a confidence score c are output.

Whether the input x is abnormal is determined by comparing the confidence score c with a set threshold $\lambda$, that is, to determine whether the input x is abnormal traffic having a threat. When the confidence score c is less than the threshold $\lambda$, x is abnormal. Alternatively, from another perspective, in the prediction process, x is normal when the model output probability is relatively concentrated, and the confidence score c is relatively high, and x is abnormal when the model output probability is relatively average, and the confidence score c is relatively low.

In step 2.1.4, in the model evaluation and iteration stage, that a mixed matrix is defined is classified into four situations: anomaly detected, anomaly not detected, normalcy regarded as anomaly and normalcy not regarded as anomaly. Each situation defines a cost value to determine the severity of a misjudgment.

An abnormal threat in the encrypted traffic is detected successfully through the preceding operations. The abnormal traffic may appear as unknown protocol, abnormal data packet size or frequency, or massive traffic inflow. A complete report of the abnormal traffic is required to provide, with information as detailed as possible, including time, location and the scope of impact. The data is re-encrypted when the report is finished.

The threat detection unit 22 based on the complex-event processing framework performs the threat analysis on the collected second unknown threat network data according to the threat event detection rule based on the complex-event processing framework to obtain the second threat detection result. To quickly discover a data security event, a device log needs to be processed in real time, so a complex-event processing (CEP) rule engine developed based on a real-time streaming big data processing framework is required. Deploying a data security event monitoring scenario on a security operation platform requires the following steps: Performance characteristics of the data security event are understood, field characteristics of the device log are inferred, event detection logic is concluded and converted into an Event Processing Language (EPL), and the EPL is integrated into the CEP rule engine and is performed. After the preceding steps, the CEP rule engine may load the threat event detection rule of the security scenario. When a device log conforming to the rule detection mode enters the CEP rule engine, event generation may be triggered.

Real-time threat detection based on complex-event processing may flexibly and efficiently process the traceability analysis of a threat scenario, quickly restore the overall picture of a leakage process and play an important role in responsibility positioning, environmental reinforcement and security prevention.

Figure 1E:
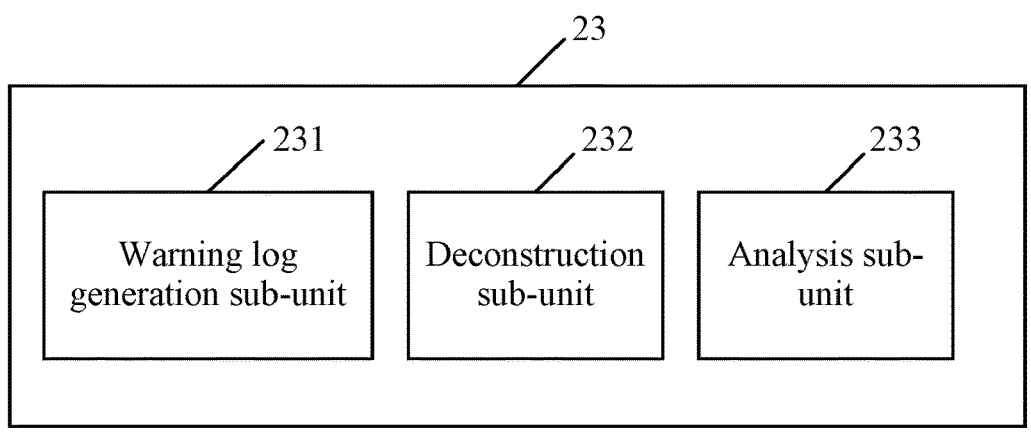
FIG. 1E is a block diagram illustrating the structure of a threat analysis unit based on behavior deep learning according to embodiment one of the present application.

In an embodiment, FIG. 1E is a block diagram illustrating the structure of a threat analysis unit based on behavior deep learning according to embodiment one of the present application. Referring to FIG. 1E, the threat analysis unit 23 based on the behavior deep learning includes a warning log generation sub-unit 231, a deconstruction sub-unit 232 and an analysis sub-unit 233.

The warning log generation sub-unit 231 is configured to generate warning information according to the first threat detection result and the second threat detection result, generate a warning log according to the warning information and input the warning log into the deconstruction sub-unit. The deconstruction sub-unit 232 is configured to form a threat chain according to the warning log. The analysis sub-unit 233 is configured to perform negative causal association pruning and non-secondary event noise reduction on the threat chain to form the threat analysis report.

The warning log generation sub-unit 231 generates the warning information according to the first threat detection result and the second threat detection result and generates the warning log according to the warning information. The process is the following: The threat analysis based on the encrypted traffic is performed on the first threat detection result output by the threat detection unit 21 based on the encrypted traffic and the second threat detection result output by the threat detection unit 22 based on the complex-event processing framework, real-time threat detection is performed on a complex-event to generate power grid data security information and warning information of an attack type, pre-processing such as de-duplication is performed on the warning information to form an analyzable warning log of a single-step attack, and the warning log is sent to the deconstruction sub-unit 232.

The de-duplication pre-processing process may include the following: a warning slice type, warning service type, attack type, warning start time, warning end time, warning type, source address, destination address, source port, destination port and other data are extracted from the warning information. Since data from different monitoring sources may generate multiple redundant warnings, the warning information shall be de-duplicated based on the retention of time information. The de-duplication rule is the following: If the warning service type, warning slice type, attack type, Internet Protocol (IP) address and port number of a piece of warning information are the same as another piece of warning information in unit time, the subsequent warning information is eliminated.

In the deconstruction sub-unit 232, the warning log is input into a threat chain deconstruction module to form the threat chain. In the threat chain, a node represents a piece of warning information. Through structured node information, the warning information is structured into several dendrograms. At this time, the warning information still has a large amount of redundancy and needs the redundancy to be further eliminated through a sub-node aggregation method. The current dendrogram is traversed layer by layer by using a breadth search method. Each layer of traversal uses the result of the previous layer of traversal as the starting point, traversing all nodes that can be accessed at a distance. In the case where redundancy is present in the warning information, the breadth search may be used for finding out the repeated warning information layer by layer and eliminating it. In this way, the overall structure of the dendrogram can be obtained based on breadth search traversal, and the threat structure chain can be constructed.

In the analysis sub-unit 233, the negative causal association pruning and non-secondary event noise reduction are performed on the threat chain to form the threat analysis report. Abnormal data of a power monitoring system comes from multiple different collection devices, and two successive warning events usually have a negative causal relationship and require to be performed with negative causal rule pruning. If "the presence of a DDos event" and "an illegal access event" cannot form a causal relationship, two nodes corresponding to the two warning events respectively are pruned. When there are too many warning events, warning noise is caused, so the non-secondary event noise reduction is also required to form the threat analysis report.

Figure 1F:
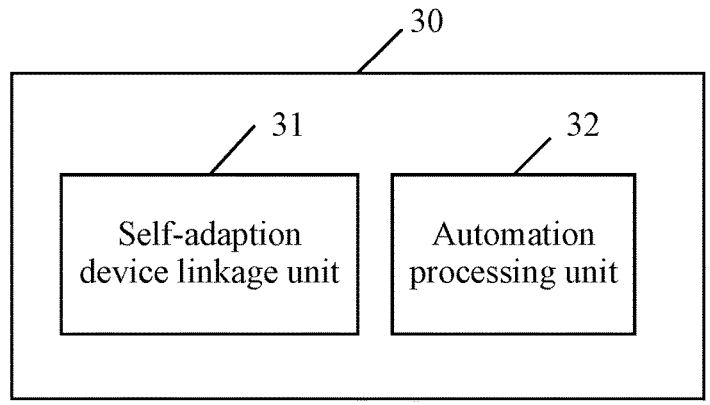
FIG. 1F is a block diagram illustrating the structure of a self-adaption defense processing module according to embodiment one of the present application.

In an optional embodiment, FIG. 1F is a block diagram illustrating the structure of a self-adaption defense processing module according to embodiment one of the present application. Referring to FIG. 1F, the self-adaption defense processing module 30 includes a self-adaption device linkage unit 31 and an automation processing unit 32.

The self-adaption device linkage unit 31 is configured to determine associated information between a device node and a link according to a constructed network topology model, update the threat defense strategy according to the associated information and trigger a processing operation corresponding to the updated threat defense strategy according to the threat analysis report. The automation processing unit 32 is configured to trigger a security device to perform the processing operation according to the threat analysis report and a workflow of a pre-constructed threat event.

The self-adaption device linkage unit 31 performs linkage on devices in the power information network according to the network topology model, determines the associated information between the device node and the link, then updates the threat defense strategy according to the associated information and triggers the processing operation corresponding to the updated threat defense strategy according to the threat analysis report.

The network topology model refers to a topology model in the power information network.

Figure 8:
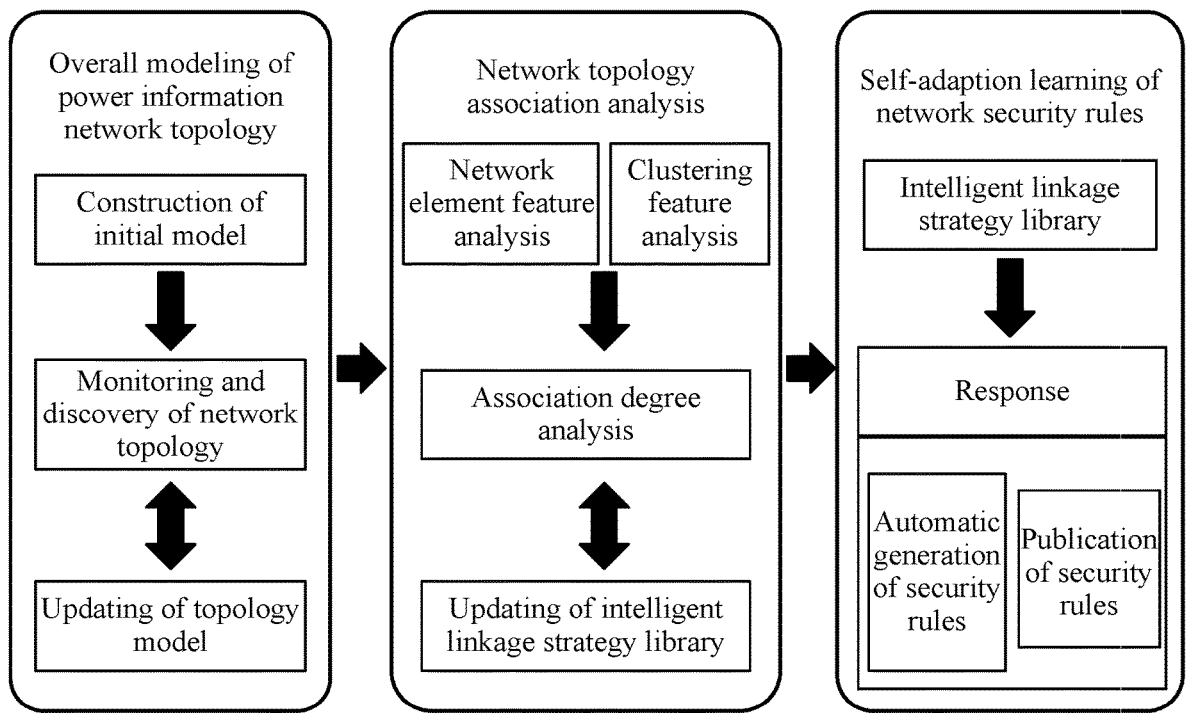
FIG. 8 is a diagram illustrating a performing process of self-adaption security device linkage according to embodiment one of the present application.

FIG. 8 is a diagram illustrating a performing process of self-adaption security device linkage according to embodiment one of the present application. As shown in FIG. 8, the process of the self-adaption security device linkage includes the following.

(1) Overall modeling of power information network topology. The automatic discovery of physical network topology reads management information base (MIB) information of the devices through a Simple Network Management Protocol (SNMP), obtains the physical connection relationship between network elements through a joint analysis of the management information base of each device and then automatically constructs a logical topology model reflecting a network security threat and a network attack and defense status. This model is composed of the description of nodes in the network, a network connection relationship, an attack rule library and attributes of attackers. The process of generating an attack path from the perspective of an attacker is the process of forward searching the network status space. Meanwhile, in the searching process, the greedy nature of the attacker needs to be ensured, so a forward and breadth-first attack path generation method is implemented for automatically generating a network attack map.

(2) Network topology association analysis. An association degree between the network node and the link is determined, and this association degree is updated to a linkage condition set of an intelligent linkage strategy library. When network topology changes, through the association analysis, which original linkage strategies are affected and which linkage strategies need to be added or deleted may be found, so as to update the linkage strategies in real time.

To distinguish complex networks in a finer granularity way, different network association features are studied, including a clustering feature, a mixing feature and a rich-club feature. The clustering feature is used for characterizing the degree of familiarity between neighbors of a node. In this method, a clustering coefficient is used for characterizing parameters of the clustering feature of the network.

Before the clustering coefficient is introduced, a local clustering coefficient C(k) needs to be calculated:

$$C(k) = \frac{m_m(k)}{k(k-1)/2}$$

$m_m(k)$ denotes an average connection number between neighbors of a node having a node degree K.

An average clustering coefficient $\overline{C}$ is calculated:

$\overline{C} = \Sigma_k P(k) C(k)$;

P(k) denotes a probability that the degree of any node in the figure is k, that is, the distribution of degrees of the nodes.

The clustering coefficient C is calculated:

$$C = \frac{\sum_k P(k) \langle m_m(k) \rangle}{\sum_k P(k)k(k-1)/2} = \frac{\sum_k k(k-1)P(k)C(k)}{\langle k^2 \rangle - \overline{k}}$$

$k^2$ denotes a second-order moment of a node degree, and $\overline{k}$ denotes an average node degree.

At present, the average clustering coefficient is usually used for measuring the clustering feature in the research field. However, this characterization parameter does not always accurately reflect the true situation of the network. The clustering coefficient is the most accurate parameter to characterize the clustering feature of the network from a global perspective. In some cases, there may be inconsistency between the average clustering coefficient and the clustering coefficient, that is, there are two a and b. $\overline{C_a} > \overline{C_b}$ is satisfied, but $C_a < C_b$. It is recommended to use the clustering coefficient instead of the average clustering coefficient to characterize the clustering feature of the network.

(3) Self-adaption learning of network security rules. Functions of constructing and updating the network topology model and analyzing network topology association lie in designing network security linkage defense strategies, updating the strategy library, generating specific security rules, and publishing the security rules according to strategy information of the strategy library. This achieves the linkage between a security device and the network security rules. When a service node triggers a security threat or security event, a defense strategy needs to be issued timely to contain the spread of a security problem. The target of most cyberattacks is to start from an endpoint and infiltrate the endpoint through long-term delay, data collection and artificial intelligence. Most of these terminal nodes refer to host devices such as servers, workstations and monitoring hosts. In conjunction with security protection devices such as a network device, a security device and an agent program, active defense control is performed on a host device having a security risk. It is necessary to comprehensively use defense measures such as service deactivation, logical blocking and physical isolation.

An active defense strategy library is the linkage or combined configuration of the network topology and the security defense measures. Based on combining the defense function of the security device and a hierarchical topology relationship, specific triggering conditions of a defense action are added, and the defense strategies are matched to the added triggering conditions of the defense action respectively according to the types of the defense strategies. The defense strategies include a malicious code protection strategy, denial-of-service protection strategy, network attack protection strategy, control sensitive operation protection strategy and illegal access protection strategy.

Figure 9:
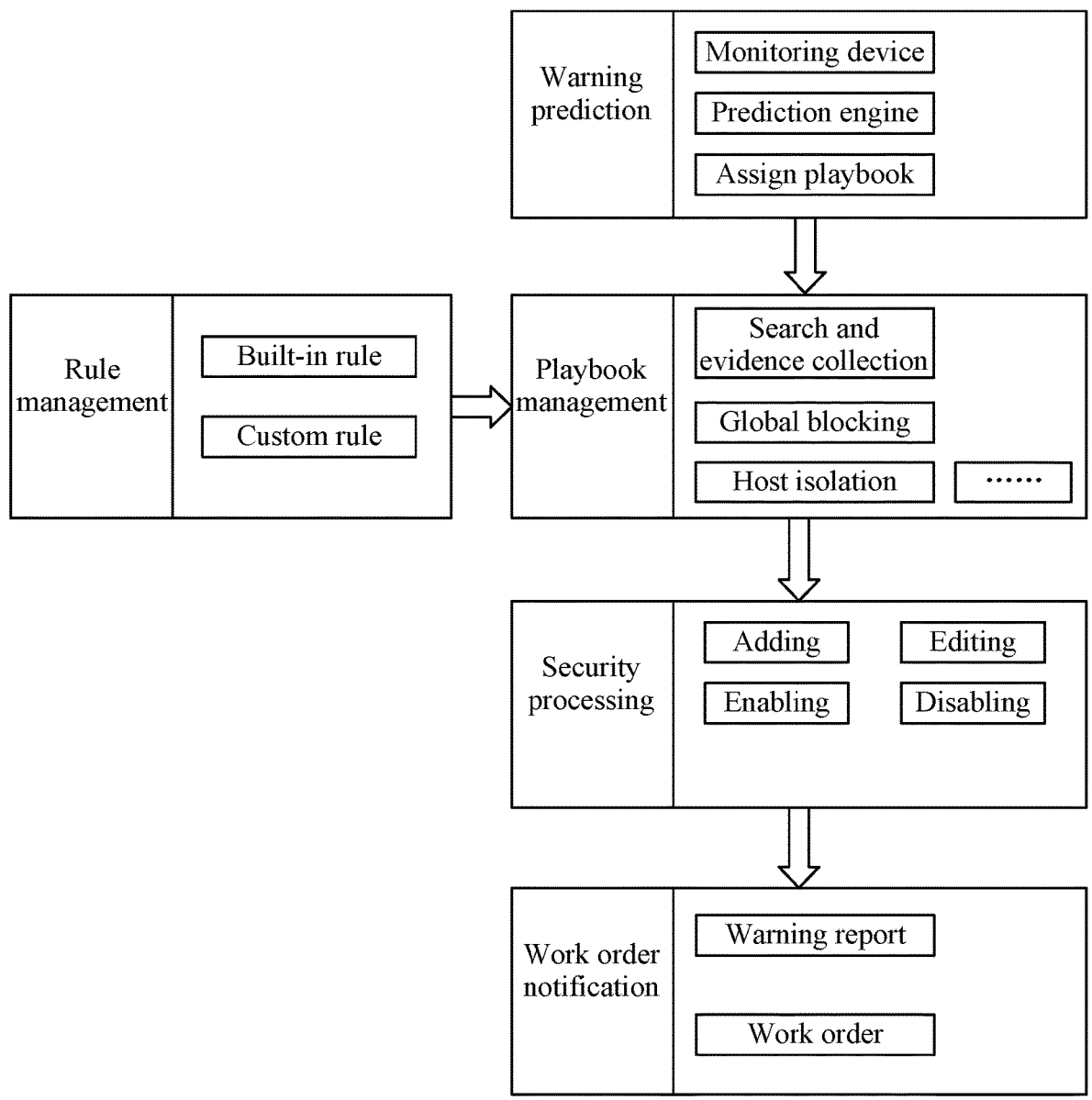
FIG. 9 is a diagram illustrating a performing process of an automation processing unit according to embodiment one of the present application.

The automation processing unit 32 triggers the security device to perform the processing operation according to the threat analysis report and the workflow of the pre-constructed threat event. FIG. 9 is a diagram illustrating a performing process of an automation processing unit 32 according to embodiment one of the present application. As shown in FIG. 9, personnel, security technologies and service flows are deeply integrated through visual orchestration, the workflow of security event processing is constructed through playbook series-parallel connection, and different security devices are automatically triggered to perform a response action. A more comprehensive and peer-to-peer understanding of the context of the security event helps transform a complex-event response process and task into a consistent, repeatable, measurable and effective workflow, transforming a passive emergency response into an automatic and continuous response. An automation processing method may be divided into the following steps. (1) A warning prediction. The warning prediction is a flow-based and continuous investigation analysis and response processing tracking and recording method, which is applicable to a group of associated behavior events. Through monitoring log events of devices such as a host, network device, security device and service application, an attack is identified, and a prediction is made. A case flow processing function, in conjunction with a prediction engine, is used for identifying case tags, and cases having different natures are assigned to different playbooks. Different processing results are recorded and returned to an event researcher. For the same rule, behavior events having the same type that occur successively are clustered under the same rule, and rule types include, but are not limited to, intrusion, denial-of-service, illegal outreach, USB flash disk insertion, high-risk port access and malicious code. This approach facilitates the mobilization of the same playbook in a tagged manner for serialized response and performing. Meanwhile, security performance measurement is performed on a response to the same event type to determine the performing efficiency and accuracy, and performing strategies are adjusted uniformly.

(2) Playbook management. A playbook is a "script" that records a workflow of a security engineer. In terms of playbook partial response processing, the playbook is constructed and saved through a visual orchestration manner and is referenced by rules. Common playbooks include research and evidence collection, global blocking, host isolation, work order and email early warning. The playbook is triggered in the case a condition is satisfied. Meanwhile, a response device is mobilized to perform a response action. In a security orchestration, automation and response (SOAR) engine, part of the triggered playbook is received and disposed, different playbooks are assigned to cases having different natures, and the different playbooks are modified and managed through custom rules and built-in rules.

(3) Security processing. Banning of automatic orchestration is achieved by a device performing a response processing action, different devices are triggered to perform the processing action through playbooks, and a linkage response device performs a one-key response. The response device includes an encryption device, isolation apparatus, monitoring device, or another network device. A response device connected to the system may achieve flexible device management functions such as adding, editing, enabling and disabling. With the help of the response device, threat interception, suspicious access source blocking, isolation of a compromised host, threat elimination and reinforcement of an uncompromised host can be accomplished.

(4) Work order notification. A response action that is not currently supported or needs manual involvement, such as fixing a vulnerability or terminal cleaning a virus file, may be pushed to a responsible person through a work order manner, and after receiving the work order, the responsible person disposes it. The email early warning includes notification of critical event generation and notification of an automation response processing result.

Embodiment Two

Figure 10:
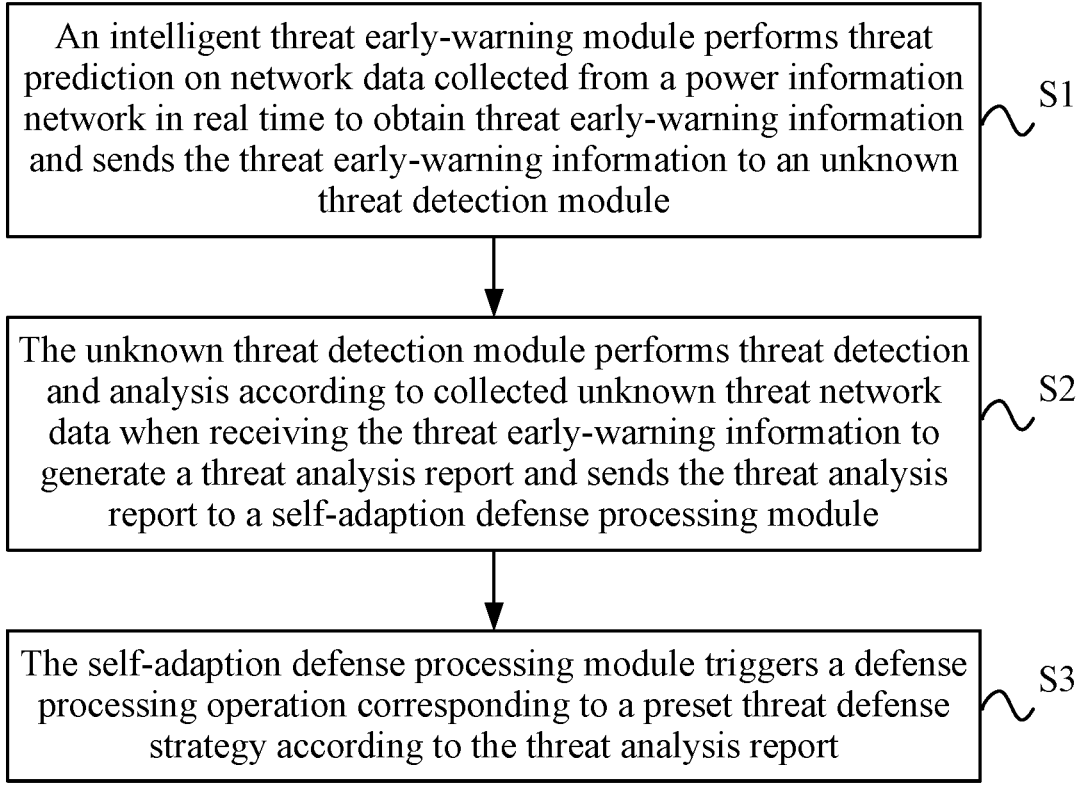
FIG. 10 is a diagram illustrating the structure of an active defense system for an unknown threat according to embodiment two of the present application.

FIG. 10 is a flowchart of an active defense method for an unknown threat according to embodiment two of the present application. The method is applicable to an active defense system for an unknown threat. As shown in FIG. 10, the method includes the steps below.

In S1, an intelligent threat early-warning module performs threat prediction on a power grid situation data set collected from a power information network in real time to obtain threat early-warning information and sends the threat early-warning information to an unknown threat detection module.

In S2, the unknown threat detection module performs threat detection and analysis according to collected unknown threat network data when receiving the threat early-warning information to generate a threat analysis report and sends the threat analysis report to a self-adaption defense processing module.

In S3, the self-adaption defense processing module triggers a defense processing operation corresponding to a preset threat defense strategy according to the threat analysis report.

In the technical solution of this embodiment of the present application, the intelligent threat early-warning module performs the threat prediction on the power grid situation data set collected from the power information network in real time to obtain the threat early-warning information and sends the threat early-warning information to the unknown threat detection module; the unknown threat detection module performs the threat detection and analysis according to the collected unknown threat network data when receiving the threat early-warning information to generate the threat analysis report and sends the threat analysis report to the self-adaption defense processing module; and the self-adaption defense processing module triggers the defense processing operation corresponding to the preset threat defense strategy according to the threat analysis report. This can form a more refined and self-adaptive security protection system, improve the monitoring early-warning capability of a system security event and improve the overall power network defense level.

Optionally, in S1, that the threat prediction is performed on the power grid situation data set collected from the power information network in real time to obtain the threat early-warning information includes the steps below.

In step 1.1, through a pre-trained situation prediction model, prediction is performed on a multi-source power grid situation data set collected from the power information network to obtain a situation prediction result, and first threat early-warning information is generated according to the situation prediction result.

In step 1.2, collected log data of a device is processed through a pre-trained data mining model and feature extraction model to obtain a threat prediction result, and second threat early-warning information is generated according to the threat prediction result.

In step 1.3, threat intelligence data of a threatened node in the power information network is acquired through an alliance chain, and third threat early-warning information is determined according to the threat intelligence data.

In step 1.4, joint early-warning information is generated according to the first threat early-warning information, the second threat early-warning information and the third threat early-warning information and sent to the unknown threat detection module.

In step 1.1, the process of predicting the collected multi-source power grid situation data set through the pre-trained situation prediction model to obtain the situation prediction result includes the steps below.

In step 1.1.1, a historical multi-resource power grid situation data set is collected, and a pre-processing operation is performed on the historical multi-resource power grid situation data set, where the pre-processing operation may include: multi-resource data smoothing, multi-resource data scaling, multi-resource data generalization and heterogeneous data integration.

In step 1.1.2, for the collected historical power grid situation data set, a moving average method is used for smoothing the multi-source data, that is, a total of 2n+1 observation values before and after the current data are averaged, and the average value is used as a substitute for the current data. The smoothing of the multi-source data may be completed by smoothing the data and eliminating data having a relatively large deviation from most of the data. The smoothing of the multi-source data can clear the irrelevant data and noise data in the multi-source power grid situation data set.

In step 1.1.3, for the obtained power grid situation data set, scaling of the multi-source data is performed by using the following formula. This step is to process the same attribute value having a relatively large range and make it fall into a specific and relatively small range.

In step 1.1.4, the following steps are performed on the obtained power grid situation data set for data generalization: ① A data table of attribute data is input; ② a generalization parameter ω is set; ③ a privacy protection threshold T of the data table is calculated; ④ all strategies in the data table are enumerated, strategies having a strategy value greater than the threshold T are directly filtered in the enumeration of the strategies, and the strategy space of the remaining strategies is generated; ⑤ for the generated strategy space, filtering is implemented by co-approximate skyline to obtain a candidate strategy space; ⑥ a skyline of the candidate strategy space is implemented to obtain a recommended strategy set; and ⑦ the recommended strategy set and its corresponding generalization are output.

In step 1.1.5, the heterogeneous data integration is performed on text data, Extensible Markup Language (XML) data, comma-separated values (CSV) data and Hadoop Database (Hbase) in the obtained power grid situation data set.

In step 1.1.6, the obtained power grid situation data set is used as an initial training sample set. A sliding window is used for constructing the initial training sample set to enable discrete multi-source power grid situation data sets to become linearly associated.

In step 1.1.7, each training prediction result is used as a training sample set so that multiple training sample sets can be obtained. A situation prediction model is constructed by a bagging method. The model is composed of 5 parallel v-SVM sub-models. The model may be used for performing power grid situation prediction.

In step 1.2, that the collected log data of the device is processed through the pre-trained data mining model and feature extraction model to obtain the threat prediction result, and the second threat early-warning information is generated according to the threat prediction result includes the steps below.

In step 1.2.1, a host device, a network device and a security device are selected for log data collection. A warning log of an Intrusion Prevention System (IPS) is used as an example, and the content format requirements of the Intrusion Prevention System (IPS)-warning log are described in Tables 1 and 2.

TABLE 1

| Content Item | Description | Format |
| --- | --- | --- |
| Device manufacturer | The security device manufacturer's name should be recorded. | Character type |
| Device type | Security device types should be recorded in numerical form. 0 = other security devices, 1 = firewall, 2 = WEB application firewall, 3 = intrusion prevention, 4 = intrusion detection, 5 = information network security isolation apparatus, and 6 = security access platform. | Integer type |
| Log type | Log types should be recorded in numerical form, 0 = heartbeat log, 1 = basic information, 2 = warning log, and 3 = strategy configuration information. | Integer type |
| Device IPv4 | The used IPv4 address should be recorded when the security device reports the warning log. | IP address type |
| Device IPv6 | The used IPv6 address should be recorded when the security device reports the warning log. | IP address type |
| Warning level | The warning log of the security device should be recorded in numerical form, with three levels of high, middle and low, 1 = low, 2 = middle, and 3 = high. | Integer type |
| Standard category | Specified standard classification categories should be recorded according to the company's relevant classification requirements. | Character type |
| Warning name | The warning name of the security device should be recorded and correspond to the minimum warning level of the device. | Character type |
| Warning time | The warning time of the security device should be recorded. | Time type |
| Source IP | The warning source IPv4 or IPv6 address should be recorded. | IP address type |
| Source port | The warning source port should be recorded. | Integer type |
| Purpose IP | The warning purpose IPv4 or IPv6 address should be recorded. | IP address type |
| Purpose port | The warning purpose port should be recorded. | Integer type |
| Transfer protocol | The transfer protocol type should be recorded. | Character type |
| Number of times of warnings | The number of times of warnings that occur should be recorded. | Integer type |
| Strategy action | An operation of the device on the warning should be recorded, 0 = other operations, 1 = pass, and 2 = blocking. | Integer type |

TABLE 1-continued

| Content Item | Description | Format |
| --- | --- | --- |
| Whether to enable IP banning | This is recorded in numerical form, 0 = no, and 1 = yes. | Integer type |
| HTTP request method | An HTTP request method is recorded. | Character type |
| Domain name | The access domain name of the source IP is recorded, such as www.sgcc.com.cn. | Character type |

TABLE 2

| Content item | Description | Format |
| --- | --- | --- |
| Access path | An access domain name space path of the source IP is recorded, such as /html/main/. | Character type |
| HTTP request or response information | The HTTP request or response information is recorded. | Character type |
| Network traffic packet | The network traffic packet content triggering the warning is recorded in the form of packet capture. | File type |
| Warning additional information I | The additional information required by the warning is filled in, and during archiving, the field content description is added before the content through the warning level corresponding to the content item field. | Character type |
| Warning additional information II | The additional information required by the warning is filled in, and during archiving, the field content description is added before the content through the warning level corresponding to the content item field. | Character type |
| Warning additional information III | The additional information required by the warning is filled in, and during archiving, the field content description is added before the content through the warning level corresponding to the content item field. | Character type |
| Warning additional information IV | The additional information required by the warning is filled in, and during archiving, the field content description is added before the content through the warning level corresponding to the content item field. | Character type |
| Warning additional information V | The additional information required by the warning is filled in, and during archiving, the field content description is added before the content through the warning level corresponding to the content item field. | Character type |

Example of transmission log format: Device manufacturer|*Device type|*Log type|*Device Internet Protocol version 4 (IPv4)|*Device Internet Protocol version 6 (IPv6)|*Warning level|*Standard category|*Warning name|*Warning time|*Source IP|*Source port|*Purpose IP|*Purpose port|*Transfer protocol|*Number of times of warnings|*Strategy action|*Whether to enable IP banning|*Hypertext Transfer Protocol (HTTP) request method|*Domain name|*Access path|*HTTP request or response information|*Network traffic packet|*Warning additional information I|*Warning additional information III*Warning additional information IIII*Warning additional information IVI*Warning additional information V.

In step 1.2.2, for the log data collected in step 1.2.1, a data column irrelevant to a threat prediction task and an entry having a large number of missing items are deleted to complete the data cleaning.

In step 1.2.3, for the log data obtained in step 1.2.2, for an entry merely having a few missing items, the data is supplemented by a nearby supplement method.

In step 1.2.4, for the log data obtained in step 1.2.3, for alphabetic string-type non-numerical data, the word2vec and doc2vec methods are used for converting the alphabetic string-type non-numerical data into vectors. For discrete data, the one-hot encoding method is used for making the discrete data continuous and converted to multi-dimensional vectors.

In step 1.2.5, for the log data obtained based on step 1.2.4, the LightGBM method is selected for training the data mining model based on a machine learning method. Important parameters of the training are described in Table 3. After 10-fold cross-verifications, the optimal parameter model is selected and saved, and the data mining model based on the machine learning method is obtained.

TABLE 3

| Parameter Name | Parameter Meaning |
| --- | --- |
| boosting | The type of a weak learner is specified, and the default value is 'gbdt', meaning that a model based on a tree is used for calculation. |
| objective | A learning task and a corresponding learning objective are specified |
| num_class | The number of categories for multi classification problems is represented |
| min_child_samples | The minimum number of leaf node samples is represented |
| eta | LightGBM does not completely trust a residual error value learned by each weak learner, so the residual error value fitted by each weak learner is multiplied by eta having a value range of (0-1]. A relatively small eta is set, so more weak learners can be learned to cover insufficient residuals |
| max_depth | The maximum depth of the tree is specified |
| num_leaves | The number of leaves is specified |
| feature_fraction | A proportion of feature random sampling when the weak learner is constructed |
| bagging_fraction | The value is between (0, 1) and is not put back to a sub-sampling |
| bagging_freq | Numerical type. If an integer z is set, a sampling is performed every z iterations |
| lambda_l1 | L1 regularization weight term, increasing the value makes the model more conservative |
| lambda_l2 | L2 regularization weight term, increasing the value makes the model more conservative |
| min_gain_to_split | The minimum loss reduction required by a leaf node for branching is specified |
| min_child_weight | The minimum sample weight sum in child nodes is specified |
| metric | An evaluation indicator is specified |
| seed | A random seed is specified |

In step 1.2.6, a deep neural network (DNN) is selected for training based on the log data obtained in step 1.2.4. In the training process, multiple batches of gradient descent are used for convergence and optimization, the optimal parameter model is selected and saved after the 10-fold cross-verifications, and the feature extraction model based on deep learning is obtained.

In step 1.3, that the threat intelligence data of the threatened node in the power information network is acquired through the alliance chain, and the third threat early-warning information is determined according to the threat intelligence data includes the steps below.

In step 1.3.1, a power system terminal of each region of the State Grid participates in a blockchain network by election and establishes an intelligence sharing blockchain network, where each power system terminal serves as a node in the network, is responsible for maintaining the blockchain ledger and handles threat intelligence sharing by setting an achievable consensus mechanism and pre-deployed program.

In step 1.3.2, when being attacked, a power system may serve as an intelligence information contributor to encapsulate information such as an attack mode and type into multiple pieces of intelligence (denoted as intelligence Info) for on-chain storage and off-chain storage. The on-chain storage requests to upload the intelligence Info to the blockchain network in the form of initiating a transaction.

In step 1.3.3, after receiving the request, an endorsement node first reads the blockchain ledger locally, signs the read blockchain status and the blockchain status obtained by participating in the transaction and returns the signature to the power system that initiated the request.

In step 1.3.4, after receiving the signature, the power system that requested to upload the intelligence packs the data and sends the data to organization nodes in the blockchain network to form a unified transaction pool and verify whether the transaction satisfies the consensus protocol.

In step 1.3.5, transactions that pass the consensus protocol are packed into the same block (denoted as block Block), and other power system nodes that participate in the consensus may be used as information acquirers at this time to acquire the block Block in which the threat intelligence Info is located through the blockchain network, verify the accuracy and legality of the transaction information in the block, add the block Block to the end of the blockchain after verification, update the ledger status and achieve the purpose of threat early warning and active defense.

Training is performed based on the power grid situation data, and a threat early-warning module based on power terminal situation perception is constructed and denoted as $M_1$. Training is performed based on power grid device log data, and an early-warning module based on integration service features of a big data prediction model is constructed and denoted as $M_2$. A client application for intelligence sharing constructed based on a blockchain method is installed and denoted as $M_3$.

For every interval $T_1$, power grid situation data in the time interval is collected and input to $M_1$ to obtain a power grid situation prediction value $R_1$. For every interval $T_2$, power grid device log data in the time interval is collected and input to $M_2$ to obtain a security event prediction number $R_2$. For every interval $T_3$, the number of threat intelligence shared by other power grid nodes in $M_3$ in the time interval is checked and denoted as $R_3$.

In step 1.4, that the joint early-warning information is generated according to the first threat early-warning information, the second threat early-warning information and the third threat early-warning information and sent to the unknown threat detection module includes the following.

$R_1$, $R_2$ and $R_3$ are comprehensively estimated. The estimation formula is:

$$Re = (R_1 \le r) \| (R_2 \ge 1) \| (R_3 \ge 1)$$

r denotes a preset power grid situation threshold. Re denotes a final estimation result, and the estimation result type is the Boolean type. When Re is False, the joint early-warning unit considers that there is no threat. When Re is True, the joint early-warning unit considers that there is a possibility of generating a threat, thereby generates the joint early-warning information and transmits the joint early-warning information to the unknown threat detection module and to the self-adaption defense processing module for prevention.

Optionally, in S2, that the threat detection and analysis are performed according to the collected unknown threat network data when the threat early-warning information is received to generate the threat analysis report includes the steps below.

In step 2.1, the threat detection is performed on collected first unknown threat network data to obtain a first threat detection result, and the first unknown threat network data includes: encrypted communication malicious traffic data, an encrypted attack behavior, or a malicious application.

In step 2.2, the threat analysis is performed on collected second unknown threat network data according to a threat event detection rule based on a complex-event processing framework to obtain a second threat detection result, and the second unknown threat network data includes log data of a threatened device.

In step 2.3, deep learning is performed on the first threat detection result and the second threat detection result to obtain the threat analysis report.

Using a data security threat detection scenario in an actual service as an example, in step 2.1, that the threat detection is performed on the collected first unknown threat network data to obtain the first threat detection result includes the steps below.

In step 2.1.1, network data packets on the power grid are captured and saved by using tcpdump and are defined as $\{x_1, x_2, \ldots, x_n\}$.

In step 2.1.2, the captured data packets on the power grid are then analyzed by using a Wireshark tool and defined by a behavior tag as $\{\hat{y}^1, \hat{y}^2, \hat{y}^N\}$.

In step 2.1.3, a classifier for classifying traffic behaviors is trained by a CNN model, the backbone of the classifier uses a ResNet-50, and the classifier is called F. When any one input x enters the F, a corresponding tag y and a confidence score c are output. Whether the input x is abnormal is determined by comparing the confidence score c with a set threshold λ, that is, to determine whether the input x is abnormal traffic having a threat. When the confidence score c is less than the threshold λ, x is abnormal. Alternatively, from another perspective, in the prediction process, x is normal when the model output probability is relatively concentrated, and the confidence score c is relatively high, and x is abnormal when the model output probability is relatively average, and the confidence score c is relatively low.

$$f(c) = \begin{cases} \text{normal,} & \text{if } c > \lambda \\ \text{abnormal,} & \text{if } c \leq \lambda \end{cases}$$

In step 2.1.4, in the model evaluation and iteration stage, that a mixed matrix is defined is classified into four situations: anomaly detected, anomaly not detected, normalcy regarded as anomaly and normalcy not regarded as anomaly. Each situation defines a cost value to determine the severity of a misjudgment.

An abnormal threat in the encrypted traffic is detected successfully through the preceding operations. The abnormal traffic may appear as unknown protocol, abnormal data packet size or frequency, or massive traffic inflow. A complete report of the abnormal traffic is required to provide, with information as detailed as possible, including time, location and the scope of impact. The data is re-encrypted when the report is finished.

In step 2.2, that the threat analysis is performed on the collected second unknown threat network data according to the threat event detection rule based on the complex-event processing framework to obtain the second threat detection result includes the steps below.

In step 2.2.1, an attacker attempts to log in (user and entity behavior analytics (UEBA) abnormal behavior-a single device logs in to multiple different accounts) to the management and collaboration software and mailbox of a specific user through multiple known accounts and a universal password, so as to browse and download sensitive information (downloading a large number of files in a short time), such as server passwords and sensitive files, thus attacking a batch of servers and causing serious data leakage. This scenario involves three types of logs: login authentication, Web access and file transmission. According to the analysis, the log of this scenario has the features below.

Login authentication log: a sudden success occurs after multiple authentication failures.

Web access log: a device suddenly logs in to multiple different accounts, deviating from its usual daily behavior.

File transmission log: a large number of files are downloaded in a short time.

Figure 11:
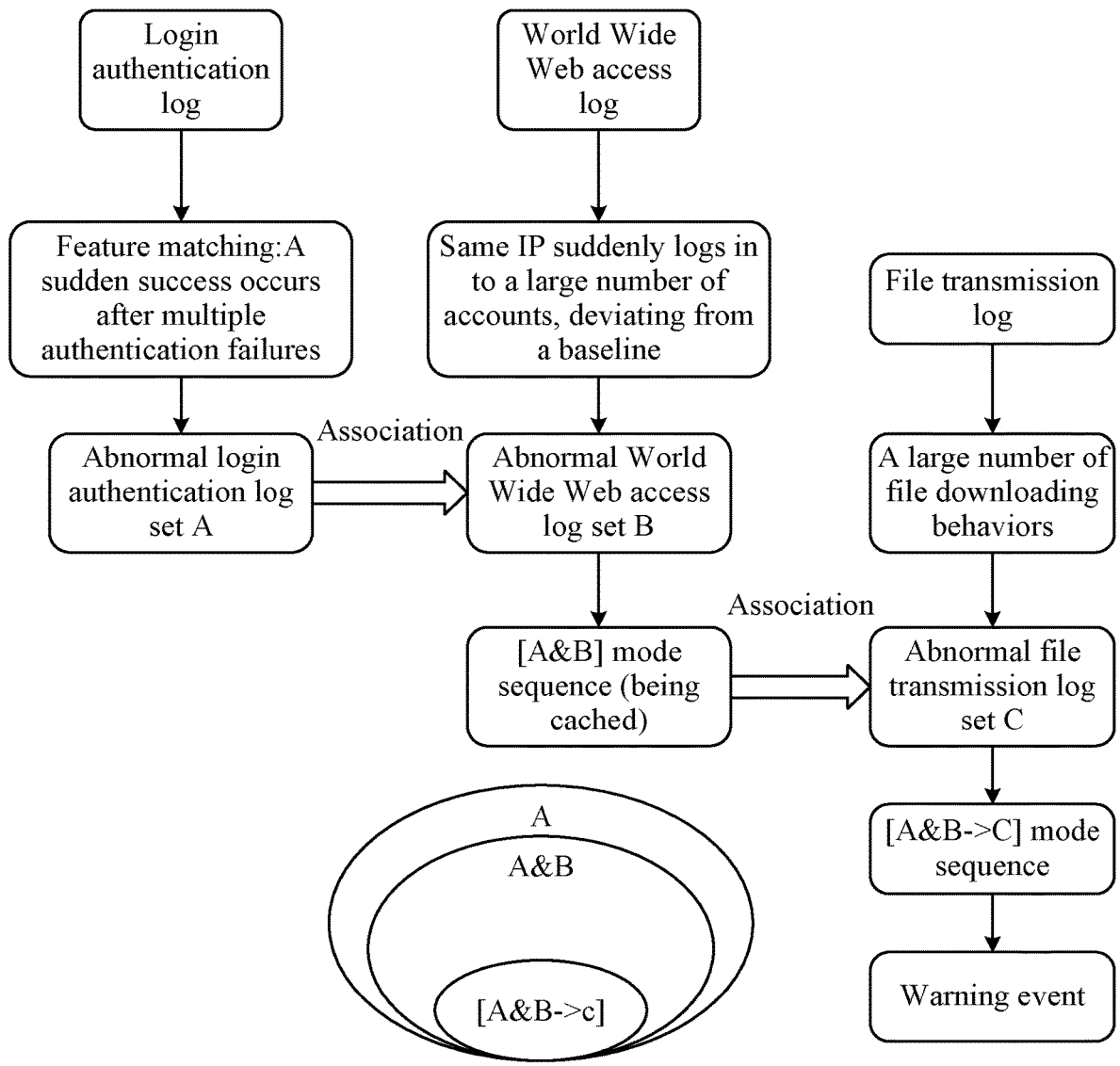
FIG. 11 is a diagram illustrating a performing process of a finite-state machine according to embodiment two of the present application.

In step 2.2.2, event detection logic is defined by using EPL, the EPL is then loaded into a CEP rule engine, and a physical performing flowchart is finally obtained by parsing and verifying the EPL and is distributed to a worker node in a cluster, and the worker node starts to perform the preceding event detection rule. Generally, most CEP engines provide the solution of a state machine, and mode matching is performed on a real-time log flow according to the event detection rule. In the specific performing process of the preceding security event detection rule, the performing process of a finite-state machine is described in FIG. 11.

The CEP rule engine continuously detects a login authentication log of the first step. If a log that undergoes a sudden login success after multiple authentication failures is detected, this is determined as abnormal, and the abnormal login authentication log is cached and denoted as set A. Meanwhile, a log source/purpose IP in the set A is monitored in real time. If there is a case where a Web access log logs in to a large number of different accounts in a short time, and the number of login accounts exceeds the normal baseline (or threshold), this is denoted as an abnormal Web access log set B. Thus, two log sets A and B are obtained, and a set obtained by associating elements in the sets A and B according to the source/purpose IP is denoted as a [A&B] mode sequence.

Similarly, the purpose IP of the set A in the [A&B] mode sequence continuously monitors whether there is a file transmission log matching an associated condition, and a large number of file transmission behaviors occur within a period of time after a login is successful, so a set C is obtained, and a [A&B→C] mode sequence is finally obtained. If the mode sequence [A&B→C] is not empty, this indicates that a log triggers the event detection rule, and a final data leakage warning event may be generated after a successful account explosion.

Figure 12:
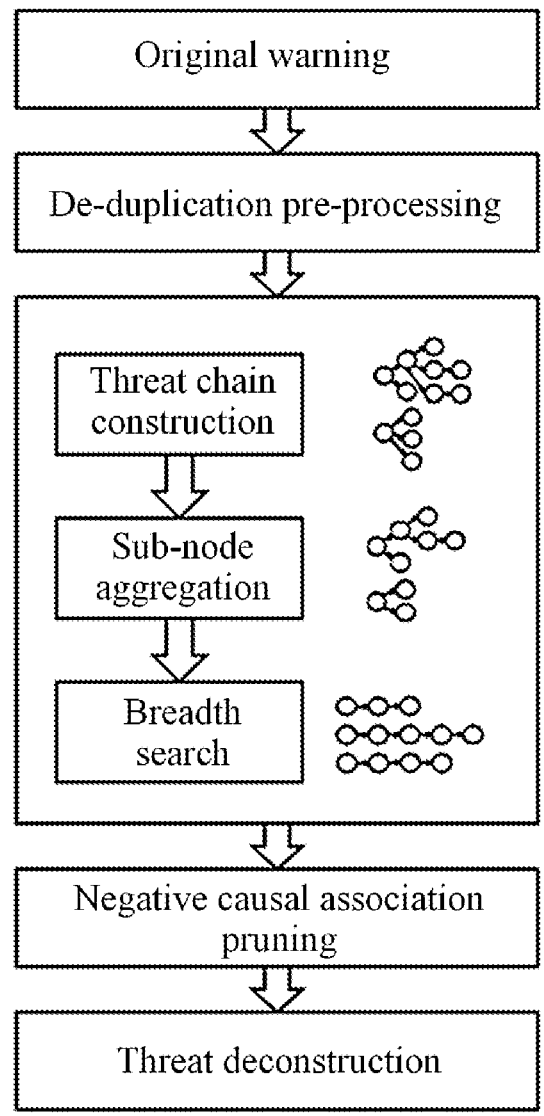
FIG. 12 is a diagram illustrating the structure architecture of a threat chain associated based on an abnormal behavior according to embodiment two of the present application.

FIG. 12 is a diagram illustrating the structure architecture of a threat chain associated based on an abnormal behavior according to embodiment two of the present application. As shown in FIG. 12, in step 2.3, that the deep learning is performed on the first threat detection result and the second threat detection result to obtain the threat analysis report includes the steps below.

In step 2.3.1, the first threat detection result output in step 2.1.4 and the second threat detection result output in step 2.2.2 are combined into an original warning.

In step 2.3.2, a warning slice type, warning service type, attack type, warning start time, warning end time, warning type, source address, purpose address, source port, purpose port and other data are extracted from the original warning, and the original warning is de-duplicated based on the retention of time information to obtain warning information.

In step 2.3.3, the warning information is structured into several dendrograms, and the current dendrogram is traversed layer by layer by using a breadth search method. Each layer of traversal uses the result of the previous layer of traversal as the starting point, traversing all nodes that can be accessed at a distance. In the case where redundancy is present in the warning information, the breadth search may be used for finding out the repeated warning information layer by layer and eliminating it. In this way, the overall structure of the dendrogram can be obtained based on breadth search traversal, and the threat structure chain can be constructed.

In step 2.3.4, negative causal rule pruning is performed on the threat structure chain to obtain the threat analysis report including a threat structure and threat category.

Optionally, in S130, that the defense processing operation corresponding to the updated preset threat defense strategy is triggered according to the threat analysis report includes the steps below.

In step 3.1, associated information between a device node and a link is determined according to a constructed network topology model, the threat defense strategy is updated according to the associated information, and the processing operation corresponding to the updated threat defense strategy is triggered according to the threat analysis report.

In step 3.2, a security device is triggered to perform the processing operation according to the threat analysis report and a workflow of a pre-constructed threat event.

In step 3.1, that the associated information between the device node and the link is determined according to the constructed network topology model, and the threat defense strategy is updated according to the associated information includes the steps below.

In step 3.1.1, device information is read through a Simple Network Management Protocol (SNMP), and a physical connection relationship between network elements is obtained through jointly analyzing management information bases of multiple devices. A logical topology model that reflects a network security threat and network attack and defense status is then constructed automatically.

In step 3.1.2, a clustering coefficient is used for characterizing the clustering feature of the network so as to determine an association degree between the network node and the link, and the association degree is updated to a linkage condition set of an intelligent linkage strategy library.

When network topology changes, through the association analysis, which original linkage strategies are affected and which linkage strategies need to be added or deleted may be found, so as to update the linkage strategies in real time.

In step 3.1.3, functions of constructing and updating the network topology model and analyzing network topology association lie in designing network security linkage defense strategies, updating the strategy library, generating specific security rules, and publishing the security rules according to strategy information of the strategy library. This achieves the linkage between the security device and the network security rules.

In step 3.2, that the security device is triggered to perform the processing operation according to the threat analysis report and the workflow of the pre-constructed threat event includes the steps below.

In step 3.2.1, the warning information in the intelligent threat early-warning module and the threat category in the unknown threat detection module are processed, warning prediction is performed, case tags are identified in conjunction with a prediction engine, and cases having different natures are assigned to different playbooks.

In step 3.2.2, a playbook is triggered in the case a condition is satisfied. Meanwhile, a response device is mobilized to perform a response action.

In step 3.2.3, different devices are triggered to perform the processing action through playbooks, a linkage response device performs a one-key response, and a response device connected to the system may achieve a flexible device management function.

In step 3.2.4, a response action that is not currently supported or needs manual involvement, such as fixing a vulnerability or terminal cleaning a virus file, may be pushed to a responsible person through a work order manner, and after receiving the work order, the responsible person takes relevant measures.

What is claimed is:

1. An active defense system for an unknown threat, applied to a power information network, the active defense system comprising: at least one processor; and a memory storing instructions executable by the at least one processor, the instructions being configured to cause the system to perform operations comprising:
   intelligent threat early-warning processing; performing threat prediction on a power grid situation data set collected from the power information network in real time to obtain threat early-warning information and sending the threat early-warning information to unknown threat detection processing,
   unknown threat detection processing: upon receiving the threat early-warning information, performing threat detection and analysis on collected unknown threat network data to generate a threat analysis report and sending the threat analysis report to self-adaptive defense disposal processing; and
   self-adaptive defense disposal processing: triggering a defense disposal operation corresponding to a preset threat defense strategy according to the threat analysis report,
   wherein the intelligent threat early-warning processing comprises early-warning processing based on situation perception prediction, early-warning processing based on big data prediction, early-warning processing based on alliance chain intelligence sharing and joint early-warning processing, wherein
   the early-warning processing predicted based on the situation perception comprises predicting a collected multi-source power grid situation data set through a pre-trained situation prediction model to obtain a situation prediction result and generate first threat early-warning information according to the situation prediction result, the early-warning processing predicted based on the big data comprises processing collected log data of a device through a pre-trained data mining model and feature extraction model to obtain a threat prediction result and generate second threat early-warning information according to the threat prediction result;

the early-warning processing shared based on the alliance chain intelligence comprises acquiring threat intelligence data of a threatened node in the power information network through an alliance chain and determining third threat early-warning information according to the threat intelligence data; and the joint early-warning processing comprises generating joint early-warning information according to the first threat early-warning information, the second threat early-warning information and the third threat early-warning information and sending the joint early-warning information to the unknown threat detection processing.

2. The system according to claim 1, wherein the early-warning processing predicted based on the situation perception comprises multi-source power grid situation data processing, situation prediction processing and threat early-warning processing, wherein the multi-source power grid situation data processing comprises collecting multi-source power grid situation data and performing data conversion and data preprocessing on the multi-source power grid situation data to obtain the multi-source power grid situation data set;

the situation prediction processing comprises inputting the multi-source power grid situation data set into the pre-trained situation prediction model to obtain the situation prediction result; and the threat early-warning processing comprises comparing the situation prediction result with a situation critical value and generating the first threat early-warning information according to the compared result.

3. The system according to claim 1, wherein the unknown threat detection processing comprises threat detection processing based on encrypted traffic, threat detection processing based on a complex-event processing framework and behavior deep learning analysis processing, wherein the threat detection processing based on the encrypted traffic comprises performing threat detection on collected first unknown threat network data to obtain a first threat detection result, wherein the first unknown threat network data comprises: encrypted communication malicious traffic data, an encrypted attack behavior, or a malicious application;

the threat detection processing based on the complex-event processing framework comprises performing threat analysis on collected second unknown threat network data according to a threat event detection rule based on the complex-event processing framework to obtain a second threat detection result, and the second unknown threat network data comprises log data of a threatened device; and the threat analysis processing based on the behavior deep learning comprises performing deep learning on the first threat detection result and the second threat detection result to obtain the threat analysis report.

4. The system according to claim 3, wherein the threat analysis processing based on the behavior deep learning comprises warning log generation processing, deconstruction processing and analysis processing, wherein the warning log generation processing comprises generating warning information according to the first threat detection result and the second threat detection result, generating a warning log according to the warning information and inputting the warning log into the deconstruction processing;

the deconstruction processing comprises forming a threat chain according to the warning log; and the analysis processing comprises performing negative causal association pruning and non-secondary event noise reduction on the threat chain to form the threat analysis report.

5. The system according to claim 1, wherein the self-adaption defense processing comprises self-adaption device linkage processing and automation processing, wherein the self-adaption device linkage processing comprises determining associated information between a device node and a link according to a constructed network topology model, updating the threat defense strategy according to the associated information and triggering a processing operation corresponding to the updated threat defense strategy according to the threat analysis report; and the automation processing comprises triggering a security device to perform the processing operation according to the threat analysis report and a workflow of a pre-constructed threat event.

6. An active defense method for an unknown threat, comprising:

intelligent threat early-warning processing: performing threat prediction on a power grid situation data set collected from a power information network in real time to obtain threat early-warning information and sending the threat early-warning information to unknown threat detection processing;

unknown threat detection processing: upon receiving the threat early-warning information, performing threat detection and analysis on collected unknown threat network data to generate a threat analysis report and sending the threat analysis report to self-adaptive defense disposal processing; and self-adaptive defense disposal processing: triggering a defense disposal operation corresponding to a preset threat defense strategy according to the threat analysis report, wherein the intelligent threat early-warning processing comprises early-warning processing based on situation perception prediction, early-warning processing based on big data prediction, early-warning processing based on alliance chain intelligence sharing and joint early-warning processing, wherein the early-warning processing predicted based on the situation perception comprises predicting a collected multi-source power grid situation dataset through a pre-trained situation prediction model to obtain a situation prediction result and generate first threat early-warning information according to the situation prediction result;

the early-warning processing predicted based on the big data comprises processing collected log data of a device through a pre-trained data mining model and feature extraction model to obtain a threat prediction result and generate second threat early-warning information according to the threat prediction result;

the early-warning processing shared based on the alliance chain intelligence comprises acquiring threat intelligence data of a threatened node in the power information network through an alliance chain and determining third threat early-warning information according to the threat intelligence data; and the joint early-warning processing comprises generating joint early-warning information according to the first threat early-warning information, the second threat early-warning information and the third threat early-warning information and sending the joint early-warning information to the unknown threat detection processing.

7. The method according to claim 6, wherein upon receiving the threat early-warning information, performing the threat detection and analysis on the collected unknown threat network data to generate the threat analysis report comprises:

performing threat detection on collected first unknown threat network data to obtain a first threat detection result, wherein the first unknown threat network data comprises: encrypted communication malicious traffic data, an encrypted attack behavior, or a malicious application;

performing threat analysis on collected second unknown threat network data according to a threat event detection rule based on a complex-event processing framework to obtain a second threat detection result, wherein the second unknown threat network data comprises log data of a threatened device; and performing deep learning on the first threat detection result and the second threat detection result to obtain the threat analysis report.

8. The method according to claim 6, wherein triggering the defense processing operation corresponding to the preset threat defense strategy according to the threat analysis report comprises:

determining associated information between a device node and a link according to a constructed network topology model, updating the threat defense strategy according to the associated information and triggering a processing operation corresponding to the updated threat defense strategy according to the threat analysis report; and triggering a security device to perform the processing operation according to the threat analysis report and a workflow of a pre-constructed threat event.

* * * * *